(12) United States Patent
Lopez et al.

(10) Patent No.: US 11,784,818 B2
(45) Date of Patent: Oct. 10, 2023

(54) EXCHANGE AND DISPLAY OF DIGITAL CONTENT

(71) Applicant: Danvas, Inc., West Hollywood, CA (US)

(72) Inventors: Hernan Lopez, Los Angeles, CA (US); Jeanne Anderson, Los Angeles, CA (US); Sergey Tsibel, Los Angeles, CA (US); David Jeon, Los Angeles, CA (US); James Kim, Los Angeles, CA (US); Robert Magnus, Dana Point, CA (US); Juan Pablo Cionci, Buenos Aires (AR); Franco Forastiero, Buenos Aires (AR)

(73) Assignee: Danvas, Inc., West Hollywood, CA (US)

( * ) Notice: Subject to any disclaimer, the term of this patent is extended or adjusted under 35 U.S.C. 154(b) by 0 days.

(21) Appl. No.: 17/985,708

(22) Filed: Nov. 11, 2022

(65) Prior Publication Data
US 2023/0155831 A1    May 18, 2023

Related U.S. Application Data

(60) Provisional application No. 63/278,915, filed on Nov. 12, 2021.

(51) Int. Cl.
*H04L 29/06*      (2006.01)
*H04L 9/32*       (2006.01)

(52) U.S. Cl.
CPC ...... *H04L 9/3213* (2013.01); *H04L 2209/603* (2013.01)

(58) Field of Classification Search
CPC ............ H04L 9/3213; H04L 2209/603; H04L 2209/605; H04L 2209/608; G06F 21/10; G06F 21/36
See application file for complete search history.

(56) References Cited

U.S. PATENT DOCUMENTS 11,182,467 B1 *   11/2021   Medina ................. G06F 3/147
2011/0246774 A1   10/2011   Phillips, II et al.
(Continued)

FOREIGN PATENT DOCUMENTS

KR    10-2012-0120483      11/2012

OTHER PUBLICATIONS

ISA: Korean Intellectual Property Office, PCT Application No. PCT/US22/49721, filed Nov. 11, 2022, International Search Report and Written Opinion dated Mar. 30, 2023, 9 pages.

*Primary Examiner* — Dao Q Ho
(74) *Attorney, Agent, or Firm* — Perkins Coie LLP

(57) ABSTRACT

A display device establishes a secure communications session with a mobile device and receives an image-based item associated with a unique cryptographic token. The display device determines, based on metadata parsed from the unique cryptographic token, authenticity information and chain-of-ownership information for the cryptographic token. In response to determining that user account information for the secure communications session corresponds to an item included in the chain-of-ownership information, the display device displays the image-based item, and an indicator component of the display device provides an indication of authenticity for the image-based item.

18 Claims, 23 Drawing Sheets

(56) References Cited

U.S. PATENT DOCUMENTS

| | | | |
|---|---|---|---|
| 2016/0203572 A1* | 7/2016 | McConaghy | G06Q 20/3827 |
| | | | 705/58 |
| 2017/0206523 A1* | 7/2017 | Goeringer | G06Q 20/3827 |
| 2017/0214522 A1 | 7/2017 | Code et al. | |
| 2022/0188839 A1* | 6/2022 | Andon | H04W 12/35 |
| 2023/0071679 A1* | 3/2023 | Kim | F17C 7/04 |
| 2023/0073859 A1* | 3/2023 | Matthews | G06Q 30/0185 |
| 2023/0085677 A1* | 3/2023 | Copeland | G06Q 20/4015 |
| | | | 705/66 |
| 2023/0117801 A1* | 4/2023 | Quigley | G06Q 20/326 |
| | | | 705/65 |
| 2023/0122552 A1* | 4/2023 | Meyers | G06F 21/64 |
| | | | 463/29 |

* cited by examiner

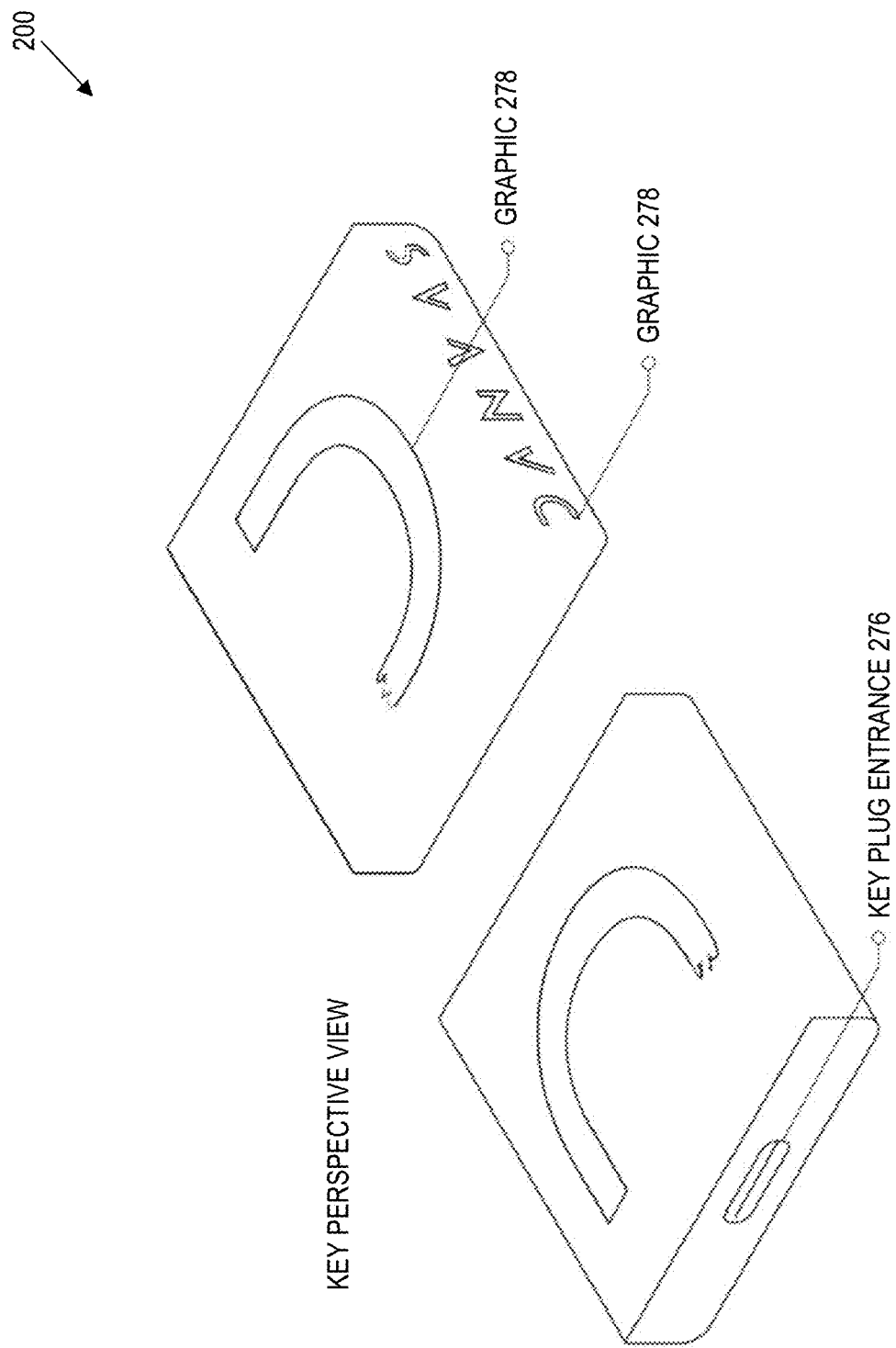

EXCHANGE AND DISPLAY OF DIGITAL CONTENT

CROSS-REFERENCE TO RELATED APPLICATION(S)

This application claims the benefit of U.S. Provisional Patent Application No. 63/278,915, filed Nov. 12, 2021, the entirety of which is incorporated herein by reference.

BACKGROUND

A non-fungible token (NFT) is a unique and non-interchangeable unit of data stored on a blockchain. NFTs can be used to represent content such as photos, videos, audio, and other types of digital content as unique items and can use blockchain technology to establish verified and public proof of ownership. The unique identity and ownership of an NFT is verifiable via the blockchain ledger. Digital content, such as works of art, can be represented as or associated with NFTs. For example, a digital work of art can be represented as an NFT and stored on a blockchain, or an NFT can be associated with the digital work of art to verify ownership while the digital work of art itself is stored elsewhere.

BRIEF DESCRIPTION OF THE DRAWINGS

Detailed descriptions of implementations of the present invention will be described and explained through the use of the accompanying drawings.

FIGS. 6A-6E are perspective views, in various orientations, of an example removable security key.

Figure 1:
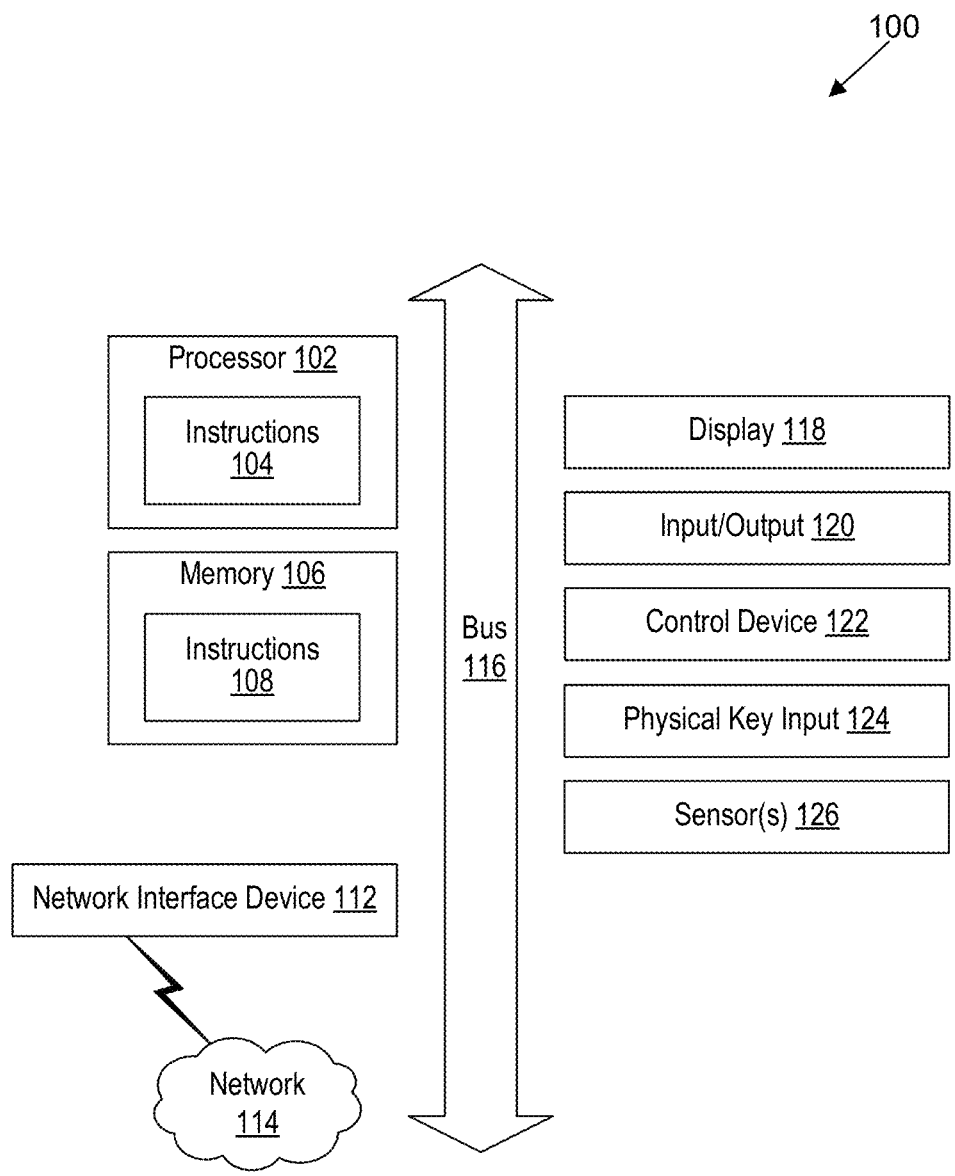
FIG. 1 is a block diagram that illustrates a device for accessing and displaying digital artworks.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein are systems, apparatuses, computer-readable media and related methods to exchange and display digital content, such as digital works of art represented as or associated with non-fungible tokens (NFTs, also sometimes referred to herein as unique cryptographic tokens) or other uniquely identifiable and trackable digital artwork. As contemplated herein, digital artworks can comprise any combination of images, such as video (a plurality of images), immersive reality content, in-game items (e.g., avatars, objects, environments, parcels of digital real estate) and/or other content (e.g., audio, text), which can optionally be stored as or associated with one or more NFTs and displayed publicly or privately using the disclosed systems and methods. As contemplated herein, digital artworks can be human- and/or machine-generated (e.g., can include generative art components, which can be algorithmically and/or interactively generated via randomizations, tiling, factorization, live coding or other suitable operations). In some embodiments, digital artworks can include user-interactive components.

The disclosed technology includes one or more devices for accessing and displaying digital artworks. In addition, the disclosed technology includes methods for facilitating transactions between parties related to digital artworks that are represented as or associated with NFTs. Example transactions can include lease transactions, rent transactions, ownership transfer transactions, and the like. In addition, the disclosed technology includes methods for interacting with digital artworks via the disclosed digital display. The interactions can include, for example, zooming in on a particular region of a displayed artwork, generating and applying a watermark to the artwork, and/or the like.

Existing devices are deficient for dedicated display of digital artworks. For example, televisions, monitors, mobile devices, tablets, and other similar display devices typically have aspect ratios that are poorly suited to dedicated display of digital artworks. In addition, existing display devices are often multi-purpose display devices, which do not provide dedicated hardware and/or software suitable for displaying digital artworks (e.g., NFTs). Furthermore, existing display devices do not allow for easy access to specialized kinds of digital content, such as easy access to NFTs at a variety of locations or modifiable content in generative digital artworks. In addition, existing technologies do not include flexible and easy-to-use platforms for exchanging digital artworks, such as platforms that allow for easy and flexible transactions to exchange digital artworks (e.g., via sale, rental, lease, as a subscription service, etc.). Accordingly, a need exists for technologies that overcome the foregoing problems and provide other advantages.

For example, a need exists for technologies that facilitate flexible and secure exchange of digital artworks (e.g., allowing for flexible transaction types, including rental or subscription models), and a need exists for technologies to provide dedicated display of digital artworks, including providing accurate information about ownership status of a displayed digital artwork. Furthermore, a need exists for technologies that are configurable for display of digital artworks having various form factors (e.g., shapes, resolutions, and/or other similar properties), such as display devices that can precisely match or be adjusted to a shape or aspect ratio of nearly any digital artwork (e.g., using a frame to mask a visual opening of the display device to adjust the aspect ratio, by reconfiguring component layouts to reshape or resize the display, etc.) and/or display devices that can adjust dimensions of a digital artwork for optimized display without stretching, distorting, or cropping an image. Furthermore, a need exits for technologies that allow for configuration of various parameters for displaying digital artworks, such as brightness and/or volume controls or other parameters that are configurable based on a desired user experience or parameters specified by an artist. Additionally, a need exits for technologies that allow for interactive display of digital artworks, such as by using one or more sensors included in a display device (e.g., motion sensors, LIDAR sensors, ambient light sensors, proximity sensors, presence sensors) and/or using gesture controls or other dynamic interactions.

In some implementations, the disclosed technology includes a display device configured to display digital artworks. The display device can comprise a dedicated high-quality display for digital content, such as a quantum dot (e.g., quantum dot-based light-emitting diode (QLED)), organic light-emitting diode (OLED), direct view LED, fine pitch LED, cold cathode LED, chip on board LED, flip chip LED or similar, and have a 4 k, 8 k or higher resolution. The display can be in a rectangular, square, or nearly square orientation (e.g., having a variety of aspect ratios, including 1:1), which can include aspect ratios that are uncommon in general-purpose digital displays. In some implementations, the display device is configured to receive one or more physical or digital keys associated with a user, each key configured to facilitate the management of digital artworks associated with the user. For example, the key can be used to access digital artworks that the user owns, rents, or otherwise has a right to access, which may be stored on a physical key device, in a control system, on a blockchain, and/or at a different location (e.g., a remote server). The display device further includes an indicator that displays one or more indications associated with digital artwork. For example, the indicator can indicate whether a digital artwork is unique, rare (e.g., on of fewer than 100, fewer than 50, fewer than 10, etc.), unlimited (e.g., one of an open-edition set), and/or part of a larger collection (e.g., one of more than 10, more than 50, more than 100, etc.). The indicator can, additionally or alternatively, indicate information about views of a displayed digital artwork. For example, an indicator can indicate whether a currently displayed digital artwork is also being viewed in a metaverse or other virtual environment, on another digital device, on another computing device, etc. In some implementations, the display device includes one or more sensors that can be used to enable an interactive experience for a viewer of the display device.

The present system can employ one or more interactive protocols that use various sensors, which may be included in a display device. For example, an interactive protocol can use motion sensors to turn a screen on, cause a device to sleep or turn off, or modify display of digital content (e.g., adjust volume or brightness) based on detecting motion or based on detecting lack of motion for a predetermined period of time. In some implementations, interactive protocols allow digital artists to create art that interacts with the viewer in real time based on one or more sensors, such as by transmitting signals from a LIDAR sensor included in or coupled to a display device. For example, the system can display a portrait of the Mona Lisa, whose eyes follow the viewer as she moves to the left or the right, a 3D rendering of a human skull that winks at the viewer when she reaches a particular viewpoint (or makes a sad face when the viewer leaves the line of sight), or a 3D rendering of a balloon dog which shakes as the viewer gets closer to the screen, then raises his leg (preparing to wet the floor) as the viewer leaves the line of sight.

These and other interactive protocols can be performed using one or more sensors included within a display device and/or using wireless communication between a display device and one or more devices associated with a viewer of a display device. For example, a viewer of a display device can be associated with a mobile device (e.g., a smartphone) that is coupled to one or more wearable devices (e.g., a smartwatch, smart glasses, wired or wireless headphones, virtual reality devices, etc.), each of which may include one or more sensors that can be activated or disabled by the viewer (e.g., thermometers, biometric sensors, cameras, microphones, etc.) and various input and input devices (e.g., touchscreens, buttons, projectors, voice-operated controls, etc.). Using one or more interactive protocols, a display device as disclosed herein can establish wireless communication with the one or more devices associated with the user (e.g., via WiFi or Bluetooth) and send and/or receive data (e.g., when a viewer opts into receiving interactive content or when a viewer is determined to be within a threshold distance from the display device). In some implementations, the interactive protocols allow display of all or a portion of a digital artwork via a viewer's one or more devices, such as by displaying visual content via one or more device screens or projectors, playing audio via one or more devices, causing devices to vibrate, and so forth. In these and other implementations, display of the digital content can be interactive in response to data received via a viewer's one or more devices or other data sources external to a display device. For example, a viewer's heartrate can be received via a smartwatch worn by the viewer, and at least a portion of the displayed digital content can be synchronized to the heartrate or otherwise dynamically modified in response to data received via the one or more viewer devices. A display device may similarly receive or access data from other external data sources, such as using an internet connection to retrieve information about news, weather, sports, date and time information, seasonal information, quantifiable news items or other conditions, and so forth. Any combination of the foregoing data can then be used to dynamically modify display of one or more digital artworks.

In some implementations, the disclosed technology includes a platform via which digital artworks can be exchanged. Although not required, the platform can be used in conjunction with one or more display devices described herein. The platform includes a mobile application (e.g., a software application that can be used on a mobile device and/or other kinds of computing devices) via which artists, galleries, and collectors can exchange digital artworks. Users can be associated with different user classes, such as an artist class, a gallery class, and a collector class. Digital artworks can be offered for exchange via the platform using various kinds of transactions. For example, digital artworks can be bought and sold, rented, leased, or offered via various subscription models. Digital artworks can be of various kinds, such as using any combination of images, video, and/or audio. The platform can be used to create or mint NFTs representing or associated with digital artworks. For example, an artist can upload a digital artwork using the platform and mint one or more NFTs associated with the digital artwork. These and other NFTs and/or digital artworks associated with NFTs can be bought, sold, rented, leased, or offered via various purchase, lease, rental, or subscription models via the platform. The platform allows for various transaction and currency types, including the use of cryptocurrencies. Additionally, the platform allows various characteristics or attributes to be assigned to or associated with various entities, such as artists, digital artworks, collections, collectors, galleries, advisers, museums, and other entities (e.g., products or users).

Advantages of the disclosed technology include providing high-quality display of digital artworks in a variety of locations. Furthermore, the disclosed technology provides for flexible and secure transactions associated with digital artworks. In addition, the disclosed technology provides technical improvements related to quickly and easily ascertaining rarity of a digital artwork. For example, although NFTs may be unique tokens, existing technologies cannot quickly and accurately verify whether a digital artwork is unique or rare. In other words, a viewer of a digital artwork typically has no way to readily determine whether the digital artwork is merely a digital copy that is non-unique (e.g., available for unlimited duplication) or if the digital artwork is part of a limited edition (e.g., associated with NFTs each evidencing ownership of a unique copy). This problem may discourage buyers from investing in digital artworks because, unlike physical artworks, mere possession of the artwork does not demonstrate uniqueness or rarity. Therefore, the Applicant's technology provides technical improvements, which provide for simplified ascertainment of rarity or uniqueness of a digital artwork.

Although certain implementations of the disclosed technology are described herein as using a display device, these and other implementations can additionally or alternatively be performed using other computing systems, such as personal computers, mobile devices, tablets, wearable devices, or any combination thereof. In addition, some implementations of the disclosed technology can be implemented at least in part in or using metaverse technologies, such as one or more decentralized, persistent online three-dimensional virtual environments, which can also comprise virtual reality and/or augmented reality technologies and/or technologies for interacting in both physical and virtual spaces.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a block diagram that illustrates a display device 100 for accessing and displaying digital content. The digital content can be one or more digital artworks represented as or associated with NFTs. As shown, the display device can include: one or more processors 102, memory 106, a network interface device 112 configured to connect to a network 114, a display 118, an input/output device 120, a control device 122 (e.g., keyboard, pointing device or both), a removable security key input 124, and one or more sensors 126 that are communicatively connected to a bus 116. The bus 116 represents one or more physical buses and/or point-to-point connections that are connected by appropriate bridges, adapters, or controllers. The display device 100 could employ a system on a chip that monolithically (non-removably) integrates multiple components, such as the one or more processors 102, memory 106, and network interface device 112. Although FIG. 1 depicts only one of each of the foregoing components, any number of these components can be included in the display device 100. Additionally or alternatively, in some implementations one or more components can be excluded and/or additional components can be included without deviating from the teachings of the present disclosure.

The processor 102 comprises one or more data processors, which can each include one or more processor cores. The processor 102 can comprise, for example a central processing unit (CPU) and/or a graphics processing unit (GPU), such as a LED processor. The processor 102 can carry and/or access instructions 104 for performing various operations described herein. The processor can include cryptographic accelerator components to assist with managing blockchain operations related to NFTs.

The memory 106 can be local, remote, or distributed, and can include multiple media (e.g., a centralized/distributed database and/or associated caches and servers) that store/access/carry one or more sets of instructions 108 for performing various operations described herein. The memory 106 can include, for example, one or more non-transitory computer-readable media. In this context, a non-transitory storage medium can include a device that is tangible, meaning that the device has a concrete physical form, although the device can change its physical state. Thus, for example, non-transitory refers to a device remaining tangible despite this change in state.

The instructions 104 and/or 108 can comprise, for example, one or more software programs configured to cause operations to be performed using the processor 102, such as operations for playing, scheduling, and/or controlling various hardware and/or software components of the display device 100. For example, the instructions 104 and/or 108 can cause display of digital artworks on the display device 100 by streaming digital content via the network interface device 112 and the network 114. The instructions 104 and/or 108 can control various parameters of the display of digital artworks, such as time of day, duration, repeat, and creation/scheduling/control of playlists. The instructions 104 and/or 108 can also control volume and brightness, establishment of default settings, and allowing for manual override of default settings (e.g., on a temporary basis).

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media such as digital and analog communication links.

The network interface device 112 enables the display device 100 to mediate data in a network 114 with an entity that is external to the display device 100 through any communication protocol supported by the display device 100 and the external entity. Examples of the network interface device 112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein. The network 114 can comprise one or more networks that are public or private and wired or wireless including, for example, the Internet.

The display 118 comprises at least one hardware display, such as a liquid-crystal display (LCD) and/or light-emitting diode (LED) display, which may include OLED or QLED displays. The display 118 can be configured in various ways that are adapted for display of digital artworks. In some implementations, the display 118 has an aspect ratio that is square or nearly square (e.g., approximately 1:1) to facilitate display of square or nearly square digital artworks. In some implementations, the display 118 has an aspect ratio of 3:4, 4:5, or 16:9, or a similar aspect ratio. In some implementations, the aspect ratio is an aspect ratio that is uncommon in typical displays and is specially configured for display of digital artworks. The display 118 may be of any size, such as having a width and/or height between 1 meter and 6 meters. In some implementations, the display 118 is configurable to adjust its shape (e.g., aspect ratio) based on a shape of a digital artwork being displayed. For example, the display 118 can comprise multiple display tiles, such as bezel-less LED tiles, each tile comprising a square or rectangular region of the display 118. The multiple display tiles can be configured in a variety of square, rectangular, or other formats, such as 4×4, 2×8, 3×5, checkerboard, or patterned formats.

The input/output 120 comprises components for receiving inputs and/or outputs of the display device 100. For example, inputs/outputs 120 can include speakers, microphones, touchscreens, and so forth.

The control device 122 can comprise, for example, a keyboard, touchscreen, pointer device, gesture-based control device, or other device for controlling one or more functions of the display device 100. In some implementations, the control device 122 comprises a computing device via which the display device 100 can be controlled, such as a desktop computer, a laptop computer, a tablet, a mobile device, and so forth.

The removable security key input 124 is configured to receive one or more removable security keys, which are described below with reference to FIG. 2A. In some embodiments, the display device 100 connects via a wireless or wired/hardware connection to the physical key and uses the physical key to access digital artworks for display via the display 118. All or a portion of the digital content can, additionally or alternatively, be output by the display device 100 in other ways, such as via a projector or hologram, via one or more speakers, and/or as a wired or wireless signal that can be received at one or more other devices (e.g., to a mobile device, a wearable device, wireless headphones, speakers, or other devices associated with viewers of the display device 100).

The display device 100 can also include various sensors 126, which can enable interactive experiences with viewers of the display device 100. For example, sensors 126 can include one or more LIDAR sensors that can detect a location of a viewer (e.g., distance, orientation, directionality, or another parameter determined relative to the display device 100) and adapt digital content displayed by the display device 100 based on the viewer location. Sensors 126 can additionally or alternatively include various sensors to detect signals from wireless devices associated with users (e.g., using Bluetooth, WiFi, or other communication protocols). The sensors 126 can include biometric sensors, cameras, temperature sensors, ambient light sensors, microphones, and so forth.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 104 and/or 108) set at various times in various memory and storage devices in computing device(s). When read and executed by the processor 102, the instruction(s) cause the display device 100 to perform operations to execute elements involving the various aspects of the disclosure. Furthermore, the operations described herein can be executed, in a coordinated fashion, by processors of any suitable devices described herein (e.g., display device, user mobile device, remote computing device) in any suitable combination of steps or sub-processes. For example, a user mobile device may initiate, using a digital key, an authentication process completed by the display device.

Figure 2A:
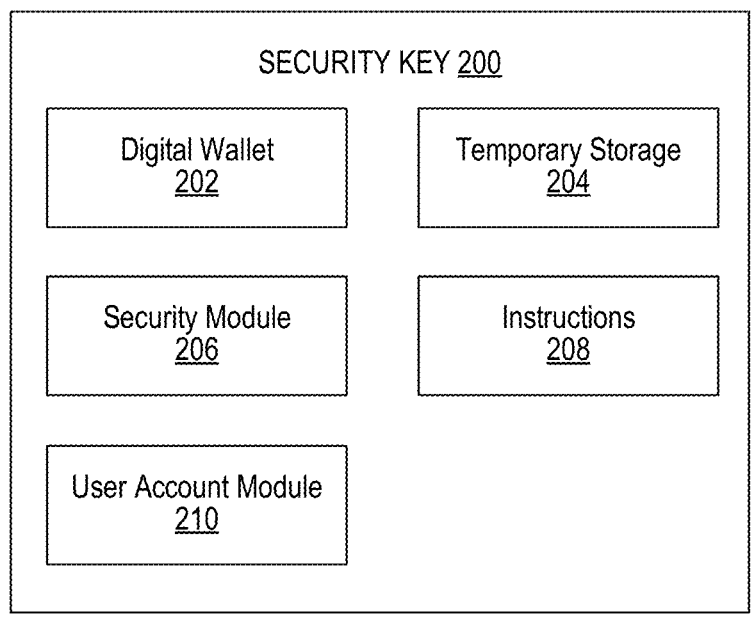
FIG. 2A is a block diagram that illustrates a removable (e.g., portable) security key configured to manage (e.g., store, access, transfer, authenticate) digital artworks.
Figure 2B:
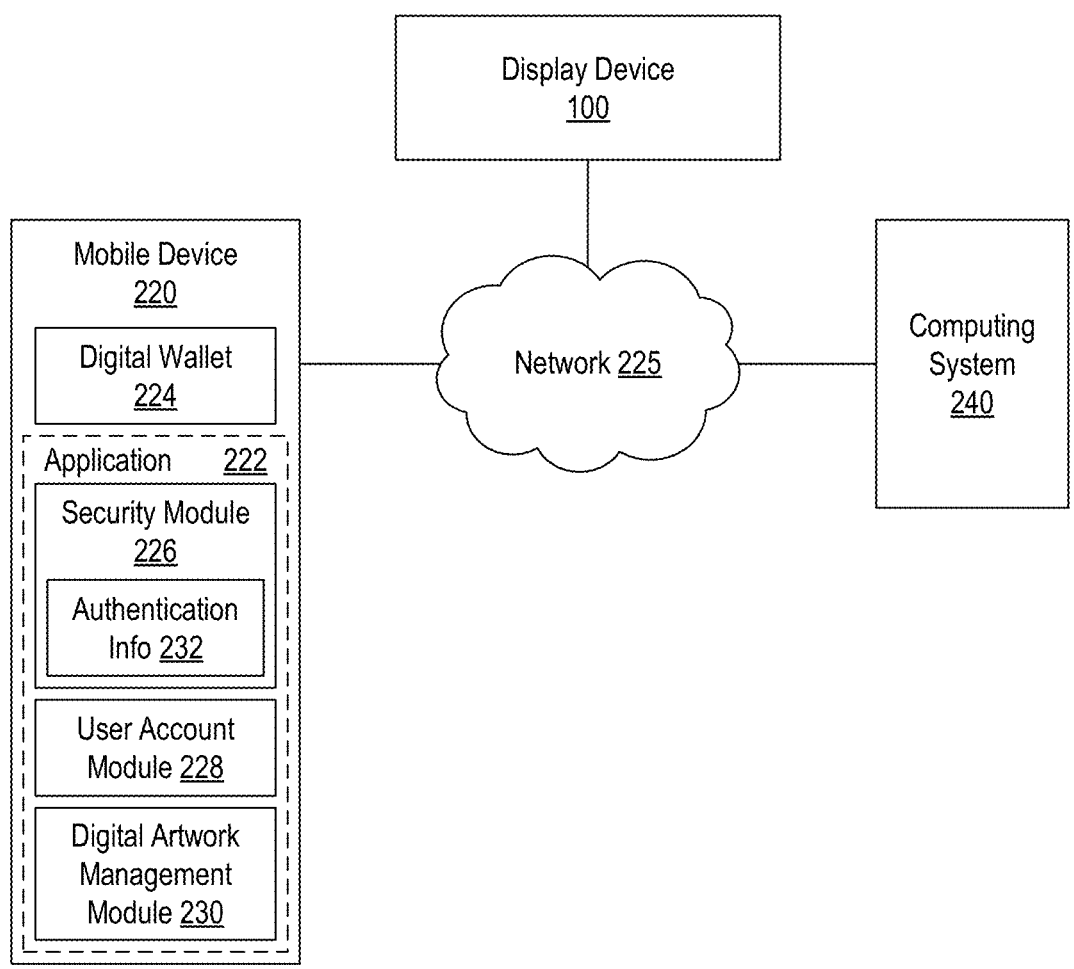
FIG. 2B is a block diagram that illustrates a computing environment for provisioning a digital security key configured to manage (e.g., store, access, transfer, authenticate) digital artworks.

FIGS. 2A and 2B illustrate aspects of securely pairing an electronic device with the display device 100 of FIG. 1. In operation, the pairing can be accomplished via an authentication process that can involve docking a physical security device to the display device 100, transmitting electronic authentication data to the display device 100 via a wireless or wired connection, or a combination of these methods.

FIG. 2A is a block diagram illustrating components of a removable security key 200 that is used together with the display device 100 to manage (e.g., provide access to and/or display) digital artworks. The removable security key 200 can be pocket-sized and portable, and comprise or be embodied in a physical key and/or a digital key. A physical key can comprise, for example, one or more circuits enclosed in a case (e.g., a metal or plastic case or another suitable housing component), that can be inserted into the removable security key input 124 of FIG. 1 and connected to the display device 100 via a wired or wireless connection (e.g., a USB or Lightning connection). The physical key dimensions can be, for example, 2 inches by 2 inches by ¼ inch or similar. The removable security key 200 comprises hardware and/or software modules, including functional modules that are implemented with a combination of software (e.g., executable instructions and computer code) and hardware (e.g., one or more memories and/or one or more processors). The removable security key 200 comprises at least one memory storing/carrying/accessing one or more of a digital wallet 202, temporary storage 204, a security module 206, instructions 208, and/or a user account module 210.

One or more digital wallets 202 can be accessed via one or more networks using the user account module 210. Digital wallets 202 can be used to access one or more public keys and one or more private keys, where the keys correspond to at least one NFT. An NFT can be a digital artwork or can be associated with a digital artwork (e.g., can comprise a hyperlink, pointer, key-value pair or another identifier sufficient to access a retrievably stored digital artwork file on a computing device or in a particular networked location). An NFT can provide evidence of proof of ownership and type of ownership of the digital artwork and/or an indication of a storage location for the digital artwork. The one or more digital wallets 202 can be configured to provide functionality described, for example, with reference to FIG. 2B.

The temporary storage 204 comprises memory for storing and/or accessing data that does not need to be permanently stored. For example, the removable security key 200 can store in the temporary storage 204 copies or playback records of and/or data related to digital artworks that were recently displayed using the removable security key 200 (e.g., the last 1, 5, 10 artworks, etc.). Additionally or alternatively, the temporary storage 204 stores stock images, video, audio, and/or other content that can be displayed on a display device as sample artworks, or other cached information. To optimize performance of the display device 100, the temporary storage 204 can be structured to refresh and/or delete cached information after a predetermined amount of time, on occurrence of a specified event (e.g., determining that the paired device 100 has been turned off), or according to another suitable parameter. In some embodiments, the temporary storage 204 is implemented on the display device 100 at least in part (that is, the cache memory uses memory 106 of the display device 100). In some embodiments, the temporary storage 204 is implemented on a securely connected mobile device, such as the mobile device 220 described in reference to FIG. 2B.

The security module 206 comprises one or more hardware and/or software security features of the removable security key 200. The security module 206 can comprise software modules for authenticating a user of the removable security key 200 using any combination of passwords, personal identification numbers (PINs), biometric identifiers (e.g., fingerprints, iris scans, voice recognition, facial scans, etc.), multi-factor authentication (e.g., by sending an identifier to a mobile device associated with a user), and so forth. Security features can include, for example, secret keys, pass phrases, access control, intrusion prevention, virus and antivirus software, hyperscale network security, application security, network analytics, types of network-related security (endpoint, web, wireless), firewalls, network segmentation, software designed perimeter solutions, VPN encryption and so forth. Further, security features can include using physical unclonable functions (PUFs) as unique identifiers on integrated circuits, where a collection of particular integrated circuits creates a string of PUFs to uniquely identify a physical device.

The instructions 208 comprise software modules used to cause one or more processors (e.g., in the display device 100) to perform operations related to digital artworks and/or users. For example, the removable security key 200 can include in the instructions 208 a software module for accessing a profile of a user associated with the removable security key 200. The profile can be stored locally and/or remotely, including on a blockchain, and can include data and metadata associated with a user and/or the user's digital artworks (e.g., artworks created, owned, rented, and/or leased by the user). The instructions 208 can also include software modules specifying one or more methods of displaying digital artworks accessed using the removable security key 200. For example, the instructions 208 can comprise one or more slideshows for displaying a series of digital artworks and associated content (e.g., narratives, artist information, and metadata about artworks). The instructions 208 can also include software modules for accessing information about displayed digital artworks, such as metadata including artist information, edition information, title, narrative, and so forth.

The user account module 210 comprises various information about one or more users, such as a user who owns or possesses the removable security key 200, including information about one or more user accounts via which the user can access and/or conduct transactions associated with digital artworks. For example, the user account module 210 can store one or more user identifiers (e.g., usernames), passwords, account numbers, payment information (e.g., stored methods of payment available to the user), digital wallet information (e.g., digital wallet(s) 202 associated with an account), user subscription information, display device settings associated with or configured by a user, contact information (e.g., phone numbers, email addresses), historical transaction information, messages sent or received, pending or proposed transaction information, and so forth. In some implementations, the user account module 210 stores information about one or more physical and/or digital keys via which the user accesses an account. For example, the user account module 210 can include a list of all keys associated with the user, and further allow the user to report lost or stolen keys, order new keys, modify or reset keys, and so forth. A key that is reported as lost or stolen can be automatically deactivated (e.g., such that the key no longer allows access to a user's account and/or digital works, methods of payment, etc.).

FIG. 2B is a block diagram that illustrates a computing environment for provisioning a digital security key (e.g., authentication information 232) configured to manage (e.g., store, access, transfer, authenticate) digital artworks. As shown, the computing environment includes a display device 100, mobile device 220, and computing system 240, all communicatively coupled via a network 225. The network 225 can include any suitable wired or wireless connections in various combinations. For instance, the mobile device 220 can connect to the display device 100 using a suitable short-range communication protocol (e.g., Bluetooth, Zigbee), another wireless protocol (e.g., WiFi), and/or a wired protocol (e.g., a USB connection, a Lightning connection). The mobile device 220 can connect to the computing system 240 via a cellular network, WiFi, Ethernet, or any suitable combination thereof. Accordingly, the network 225 can include the Internet.

The mobile device 220 can be operated by a user (e.g., owner or holder of digital artwork to be displayed by the display device 100) and can be any of a cell phone, a tablet, a laptop, or another suitable electronic device. As shown, the mobile device 220 can include an application 222 and/or digital wallet 224.

The digital wallet 224 can be a hardware-based wallet (e.g., can include dedicated hardware component(s) external to the mobile device 220), a software-based wallet, or a combination thereof. The digital wallet 224 can be structured to manage any suitable type of digital assets, including NFTs. In some embodiments, the application 222 includes, at least in part, the digital wallet 224. For example, a provider of the display device 100 can provide a custodial digital wallet application to store NFTs. In some embodiments, the digital wallet 224 is a non-custodial wallet relative to the provider of the display device 100, and the application 222 is structured to securely access one or more digital wallets 224, which can be provided and/or managed by a user, a third party relative to the provider of the display service, or another entity. Advantageously, the non-custodial wallet arrangement enhances security, portability, and accessibility of digital assets. For example, in some embodiments, users are enabled to connect, via the application 222, to two or more digital wallets 224, which may be provided by different parties, and combine the digital artworks therefrom in a playlist cast to the display device 100.

The digital wallet can 224 can be configured to store keys to digital assets in a secure memory block, which can be monolithically or removably integrated with the mobile device 220. In some embodiments, the digital wallet 224 stores the keys on a remote computing system relative to the mobile device 220 and makes the keys accessible via a wallet interface application provided to the mobile device 220. The keys stored in the digital wallet can uniquely identify assets retrievably stored by the computing system 240, which, in some embodiments, can be a blockchain-based system. Further, the digital wallet 224 can be configured to store authentication information, configuration information, and/or asset management instructions.

As shown, the application 222 can include any of a security module 226, a user account module 228, and/or a digital artwork management module 230.

In operation, the security module 226 can enable the application 222 to authenticate a user to a particular digital wallet 224 (e.g., via the authentication information 232, which can include a public blockchain address associated with the digital wallet 224, a passcode, a passphrase, a password, biometric authentication information, an access key, and/or the like). The security module 226 can also help establish a pairing session between the display device 100 and the mobile device 220 using authentication information 232, which can include an application 222 instance identifier, device identifier, or other similar information. For example, after determining that the devices established an electronic connection (e.g., via Bluetooth, USB, Lightning, and/or the like), the security module 226 can provide an instance identifier for the application 222, a device identifier, or other suitable information via the electronic connection to the display device 100 to complete the authentication process. In some embodiments, the security module 226 can establish and manage a secure authorized communications session between the devices. In some embodiments, the secure authorized communications session can be parameter-limited. For example, parameters for the secure authorized communications session between the mobile device 222 and the display device 100 can enable the mobile device 220 to cast digital artwork to the display device 100 when the two devices are within a predetermined distance from each other (e.g., 3 ft, 5 ft, 10 ft, 20 ft, 50 ft), when a particular user is logged into the application 222, when a particular user is logged into the display device 100, and/or for a predetermined duration of time.

The user account module 228 can be structured to manage (e.g., retrievably store, access, create, modify, validate) user information and/or authentication information that relates to establishing a secure connection between the display device 100 and the mobile device 220. As discussed above, the user information can include any of a user account information, an instance identifier for the application 222, a device identifier, or other suitable information suitable for uniquely identifying and managing a secure connection between the display device 100 and mobile device 220.

The digital artwork management module 230 can store computer-executable instructions that enable a user to manage digital artwork (e.g., NFTs). For instance, the digital artwork management module 230 can provide one or more user interfaces to enable a user to create a playlist, access a digital artwork, change display parameters for a digital artwork, cause the mobile device 220 to cast or otherwise electronically transmit the digital artwork to the display device 100 and the like. In some embodiments, the digital artwork management module 230 can provide one or more user interfaces to enable a user to access a digital artwork marketplace and/or perform transactions involving digital artwork.

Figure 3:
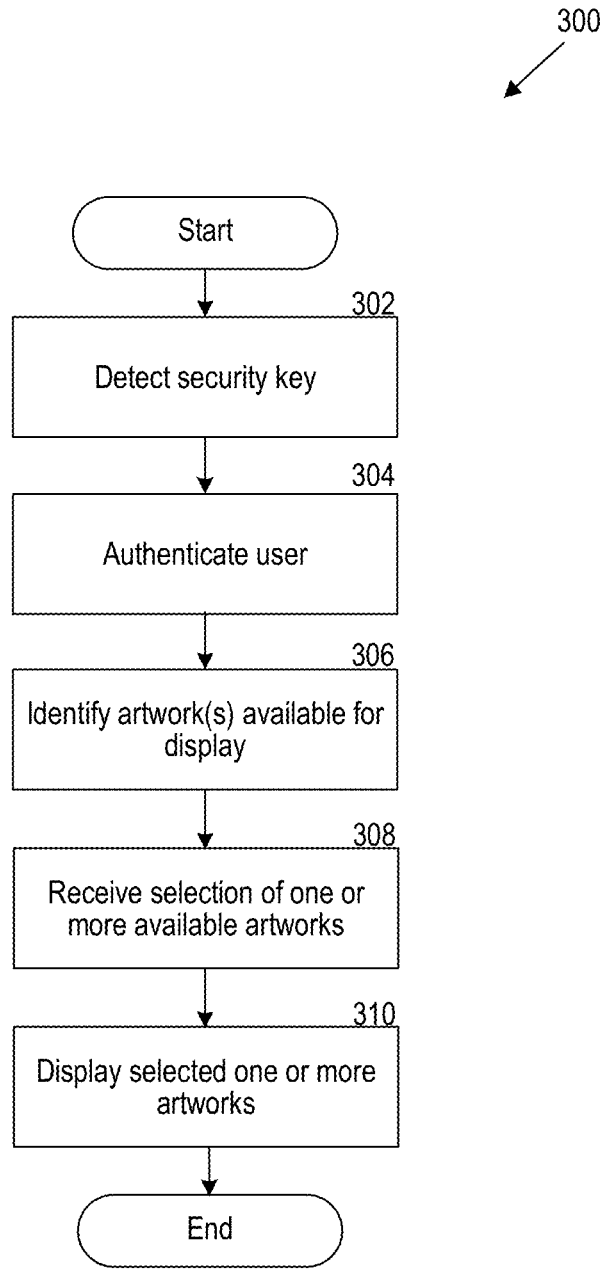
FIG. 3 is a flow diagram that illustrates a process for accessing and displaying digital artworks.

FIG. 3 is a flow diagram that illustrates a process 300 for accessing and displaying digital artworks. All or portions of the process 300 can be performed by a display device 100. Additionally or alternatively, at least a portion of the process 300 can be performed by the removable security key 200 and/or another device, such as a remote computing system and/or a mobile device associated with a user.

The process 300 begins at block 302, where insertion of a removable security key (e.g., removable security key 200) is detected at a display device (e.g., display device 100). In some implementations, insertion of the removable security key 200 causes the display device to turn on or wake from a sleep mode. In some implementations, the process 300 instead begins with initiation of a keyless access mode, such as by receiving access credentials input by a user or by determining that a particular mobile device attempts to establish a wired or wireless connection with the display device 100. If the mobile device had not previously connected to the display device 100, the display device 100 can generate, or cause a provider computing system to generate, and display a code or a passphrase. A push notification or prompt can be delivered to the mobile device and prompt the user to enter the code or passphrase. An application provided to the mobile device can validate the entered code or passphrase against the generated code or passphrase (e.g., by querying a provider computing system associated with the application settings for a copy of the code or passphrase).

The process 300 then proceeds to block 304. In some embodiments, a user associated with the removable security key can be authenticated using some combination of a key, password, PIN, and/or multi-factor authentication. For example, a display device (e.g., display device 100) can display one or more interfaces to request credentials to authenticate a user, and the user can enter the credentials using one or more input devices associated with the display device (e.g., a keyboard, touchscreen, gesture-based input, biometric sensor, etc.). In some embodiments, the user is authenticated based on presenting a key (e.g., at block 302) without presenting any additional authentication factors. In some embodiments, both a user authentication and a device authentication (e.g., a key authentication) are performed. In some embodiments where a digital key is used to authenticate a user, an application provided to the user mobile device can be structured to electronically transmit authentication information (e.g., application instance, application session, logged-in user, cryptographic key) to the display device 100. The display device 100 may query a provider computing system for a copy of the authentication information to determine that authentication information is valid for a particular mobile device. To enable this process, the mobile device can transmit to the display device 100 a device identifier, such as a MAC address, an International Mobile Equipment Identity (IMEI) number, an International Mobile Subscriber Identity (IMSI) number, an Integrated Circuit Card Identifier (ICCID), s Subscriber Identity Module (SIM) identifier, an eSIM identifier, a unique equipment identifier associated with a transceiver on the mobile device (e.g, antenna, Bluetooth module), or another similar hardware, integrated circuit, or digital identify identification feature.

In some embodiments, the display device 100 may query a provider computing system for a copy of the authentication information to determine that authentication information is valid for a particular combination of mobile devices and devices 100. That is, according to various embodiments, applications on mobile devices can allow users to cast digital artworks to any display device 100 or to a specific subset of display devices 100. Enabling users to cast digital artworks to any of display devices 100 can increase accessibility and portability of digital artworks—for instance, a guest user can easily connect to a host's display device 100 to showcase digital artworks. Enabling users to cast digital artworks to specific subsets of displays 100 enhances security of participating devices and privacy of associated users.

Once authentication is complete, the process 300 then proceeds to block 306, where one or more digital artworks are identified as being available for display. The operations at 306 can be performed by the physical key device and/or a user mobile device. For example, a location of each available digital artwork can be ascertained using one or more digital wallets (e.g., digital wallet 202 or 224) and/or account information (e.g., accessed via the user account module 210 or 228) and one or more associated public keys. In some implementations, a local copy of a digital artwork can be stored on a removable security key and/or in memory of a display device in cached form, and the digital artwork is identified as being available for display using the local copy. In these and other implementations, an interface can be provided via the display device that displays an indication of each available digital artwork. The indication can include any combination of a thumbnail image, a title, an artist name, a data of creation, a description, and/or edition information (e.g., open edition, limited edition, etc.) about an artwork. The display of the available artworks can be arranged in various configurations. For example, a default number (e.g., 1, 3, 5, 10) of recently viewed works can be display based on the date the artwork was last displayed. Additionally or alternatively, artworks can be arranged, searched, and/or filtered based on title, date of creation, artist name, increasing or decreasing rarity, market value, or any other attribute associated with the digital artwork. In some implementations, identifying digital artworks available for display can include identifying or generating sequences or playlists of digital artworks based on shuffling (e.g., random or pseud-random ordering).

In some implementations, multiple artworks identified at block 306 can be identified as being available for display as a set (e.g., a sequence, slideshow, coordinated exhibition, playlist, etc.). For example, the interface can include an indication of a series or exhibition organized based on title, date of creation, date of purchase, aspect ratio, last viewed date, viewing frequency, artist name, a common artist, theme, subject matter, genre, increasing or decreasing rarity, market value, or any other attribute associated with a digital artwork.

In some implementations, a unique security code or other identifier associated with a removable security key (e.g., removable security key 200) is received at a central server or another type of provider computing system, which provides access to a "vault" (e.g., via the user account module) and/or associated digital wallets (e.g., digital wallet) via which digital artworks can be accessed.

The process 300 then proceeds to block 308 where a selection is received of one or more digital artworks to be displayed on the display device 100. A user can select a digital artwork or a set of digital artworks in various ways, such as by pressing a button or icon, using a mouse, trackpad, touchscreen, remote control device, performing a gesture, using an application provided to the associated mobile device, and so forth.

The process 300 then proceeds to block 310, where the selected one or more digital artworks are displayed via the display device (e.g., display device 100). Displaying the one or more artworks can comprise displaying one or more images and/or videos via a display device, such as display device 100, and/or playing audio content via the display device. In some implementations, at least a portion of the one or more artworks can be displayed via one or more other devices, such as by wirelessly transmitting or broadcasting all or a portion of the one or more artworks to a mobile device or an accessory device (e.g., a wearable device or earbuds/headphones) associated with a viewer. In some implementations, at least a portion of the one or more artworks can be cast from one or more other devices, such as a user mobile device paired to the display device 100.

In some implementations, displaying the one or more digital artworks further comprises providing an indication of edition information associated with a digital artwork, the edition information indicating whether the digital artwork is unique, limited edition (e.g., one of 5, 10, 50, 100, 250, 1000, etc.), or an open edition (e.g., being reproduced without limitation). The edition information can be displayed using a dedicated indicator, such as a color-coded display using one or more light-emitting diodes (LEDs) or other indicator lights, or in a region of an interface displayed on a display device. For example, an indicator may glow a first assigned color to indicate that a displayed digital artwork is unique, a second assigned color for a limited edition, or a third assigned color for unlimited and/or collection pieces (e.g. artwork that the user has a right to access but is not owned by the user). Edition information can also be accessed via a link in a digital wallet that points to the original artwork or stored in memory of a display device. In some implementations, the indicator can indicate additional or alternative information, such as whether a displayed digital artwork is owned or rented (e.g., temporarily available to a user via a subscription service). Although described herein as a color-coded indicator, other types of indicators can be used, such as numerical or letter-graded ranking, shapes, classes or categories (e.g., premium content, economy content, gallery content, collector content, etc.), or other classifications.

In some implementations, all or a portion of the one or more displayed digital artworks are temporarily stored in a memory of the display device. In these and other implementations, the display device can determine when a removable security key has been removed and, in response to the removal of the removable security key, automatically delete the displayed digital artworks from the memory of the display device (e.g., to prevent unauthorized access to or copying of the digital artworks by subsequent users of the display device).

Although the process 300 illustrates operations performed in a particular order, the operations can be performed in a different order, including performing one or more operations in parallel. Additionally or alternatively, operations can be added to or omitted form the process 300 without deviating from the teachings of the present disclosure.

Figure 4:
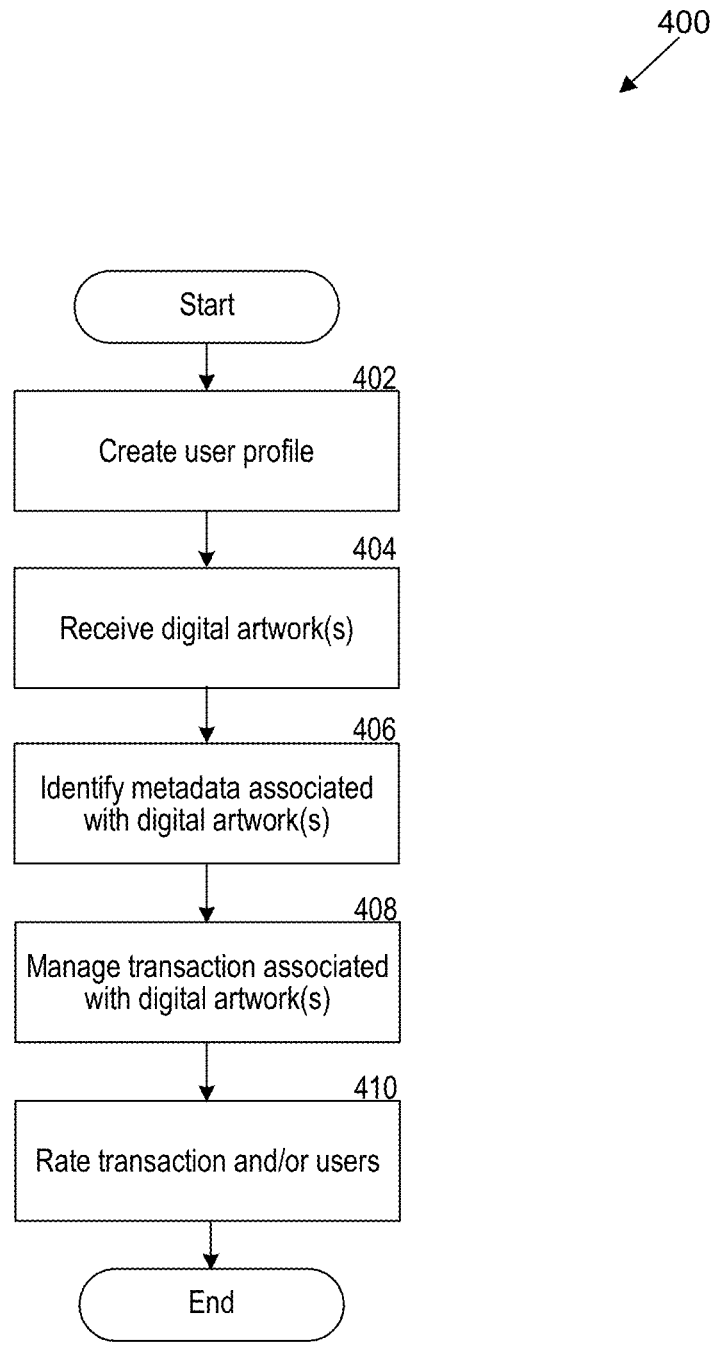
FIG. 4 is a flow diagram that illustrates a process for managing transactions associated with digital artworks.

FIG. 4 is a flow diagram illustrating a process 400 for managing a transaction associated with a digital artwork. Although not required, all or a portion of the process can be performed using a display device, such as display device 100. Additionally or alternatively, all or a portion of the process can be performed using a mobile device, personal computer, tablet, wearable device, or other user equipment. At least a portion of the process 400 is performed using the platform disclosed herein for facilitating exchange of digital artworks.

In some implementations, at least a portion of the process 400 is performed via an artist portal of the platform, which can allow an artist to upload and share various information about the artist and/or digital content provided by the artist. For example, the artist can provide a name, biographical information, background information, profile information, and so forth. In addition, the portal allows an artist to specify various information about digital artworks uploaded to the platform, such as transaction type (sale, lease, rental, subscription, auction, etc.), price or opening bid, level of rarity/edition information (unique, rare, limited edition, open edition, etc.), and associated NFT information. The artist portal also allows artists or other users to mint new NFTs, such as NFTs representing or associated with digital artworks.

In these and other implementations, the platform can also include a buyer portal (e.g., for collectors, galleries, artists, etc.), via which buyers can view available digital artworks, purchase or bid on the digital artworks, execute transactions (e.g., pay using tokens, cryptocurrency, debit or credit cards, barter, etc.), and accept ownership or possession of purchased or rented digital artworks.

The process 400 begins at a block 402, where a user profile is created. For example, the disclosed platform can provide one or more interfaces for registering users of the platform. The user profile includes a username, screenname, or other unique identifier associated with the user. The user profile can also include various identifying information or contact information, as provided by a user. The user profile can be associated with one or more user classes, such as an artist class, a gallery class, and/or a collector class. The user profile can also include various information and/or metadata about the user, such as a narrative describing an artist, a gallery, or a collector, a user location, category information about the user (e.g., artist media, genre or style, similar artists, etc.). The user profile can include subjective attributes associated with a user, such as a mood or emotion associated with the user and/or the user's artistic preferences.

The process 400 then proceeds to block 404, where the user submits/posts one or more digital artworks. The digital artworks can be provided in various ways. For example, where the digital artwork already exists as an NFT or is associated with an existing NFT, the digital artwork can be submitted by providing a public key identifying a location of the digital artwork and/or a private key evidencing ownership of the digital artwork. Where a digital artwork is not yet associated with an NFT, the user may upload a copy of the digital artwork contained in one or more files containing images, video, and/or audio content. In some implementations, the display device and associated software described herein can further allow artists to upload each artist's bio, artist's statement, and/or artwork story descriptions and attributes in audio, video, or written form, analogous to information included in 'museum labels' next to works of art. In these and other implementations, the platform can mint one or more NFTs representing and/or associated with the digital artwork. For example, a generated NFT can be associated with the digital artwork, such that the NFT indicates a location of the digital artwork that is stored elsewhere. Additionally or alternatively, a generated NFT can represent the digital artwork, which is stored on a blockchain. In these and other implementations, the number of NFTs generated can be based on a user input, which may specify how many copies of the digital artwork the user wishes to make available for sale.

The process 400 then proceeds to block 406, where various metadata about the received one or more digital artworks is identified and/or received. The metadata can be provided by the user who submits the one or more digital artworks and/or automatically extracted by the platform and/or identified via an external information source, such as a blockchain (e.g., by searching the internet for information about a particular NFT). For instance, circuitry on the display device 100, key 200, and/or mobile device 220 can be structured to query a computing system that manages the NFTs associated with the digital artwork. The metadata can include, for example, artist name, edition information, title, narrative information, year created, and so forth. In some embodiments, the metadata can include data items and/or instructions to set the indicator of the display. For example, the metadata can include a number of digital items in a set, an indication of whether the digital artwork is an open-edition artwork, information about the collection associated with the digital artwork, etc. In some embodiments, the metadata include information about views (e.g., current or point-in-time) of a displayed digital artwork. In some embodiments, additional information can be periodically received at the display device 100 to supplement point-in-time metadata associated with a particular NFT. For example, the point-in-time metadata can be periodically updated by re-querying the computing system 240 to determine a current number of concurrent views. As another example, the point-in-time metadata can include current ownership, rental, lease and/or subscription information for the NFT. When the additional information is received at the display device 100, the indicator can be updated accordingly.

The process 400 then proceeds to block 408, where the platform manages one or more transactions associated with the received one or more digital artworks. For example, the platform can make each received digital artwork available for searching and/or filtering via a database of available digital artworks. Other users can use the platform to locate the digital artworks based on metadata, such as title, date of creation, date of purchase, aspect ratio, last viewed date, viewing frequency, artist name, theme, subject matter, genre increasing or decreasing rarity, market value, or any other attribute associated with the NFT.

Transactions managed via the platform include two or more users who are parties to the transaction, such as a buyer, a seller, an owner, a renter, an agent, an adviser, a gallery (e.g., a representative of an artist), an artist, or any combination of the foregoing. To commence a transaction, a user selects an available digital artwork and a type of transaction. The transaction can be, for example, a purchase (with or without copyright assignment) or a rental (e.g., month-to-month, fixed term, autorenewal, etc.) of the digital artwork. Each transaction type can be associated with payment terms specified by a seller (e.g., fixed price, auction, monthly price, etc.). The user provides payment via the platform, which can be in the form of cryptocurrency, a token, a debit or credit card transaction, or via a third-party transaction platform. The transaction can further include executing contract terms, which can be encoded in a smart contract stored on a blockchain. The contract terms can govern, for example, ownership and/or right to display an associated digital artwork, copyright or other intellectual property rights, time limits, or other terms.

Managing a transaction associated with a digital artwork further includes generating and/or transferring one or more NFTs or other tokens associated with the digital artwork. For example, where a buyer takes ownership of a digital artwork, the platform provides and/or facilitates transfer of a token evidencing ownership of the artwork from one wallet to another (e.g., from a seller's wallet to a buyer's wallet).

The process 400 then proceeds to block 410, where each party to the transaction is invited to rate the transaction and/or other users associated with the transaction. The rating can include, for example, a grade, star, or numerical ranking and/or a narrative or review explaining the rating. The rating can be used to generate one or more scores. These ratings can be used, optionally with other information, to generate one or more scores for a user characterizing one or more attributes of the user, such as trustworthiness, artistic expertise, consistency, and so forth. A user's rating and/or score can then be displayed to other users to inform subsequent transactions associated with the user and/or used to make recommendations for the user or another user. Additionally or alternatively, one or more such scores associated with a user can be used to recommend transactions and/or digital artworks for the user. For example, upon accessing the platform, the user can input information including a "mood" (e.g., a subjective state, such as emotion, attitude, style, color, location or environment, artist, etc.), which can be combined with the one or more scores and/or other factors (e.g., purchase history, price range, desired characteristics of artworks) to recommend, by the platform, one or more digital artworks to the user.

Although the process 400 illustrates operations performed in a particular order, the operations can be performed in a different order, including performing one or more operations in parallel. Additionally or alternatively, operations can be added to or omitted form the process 400 without deviating from the teachings of the present disclosure. For example, the process 400 can include making recommendations to a user about one or more digital artworks to rent or buy, based at least in part on the user's profile and various attributes of digital artworks, such as title, date of creation, date of purchase, aspect ratio, last viewed date, viewing frequency, artist name, theme, subject matter, genre increasing or decreasing rarity, market value, or any other attribute.

Figure 5A:
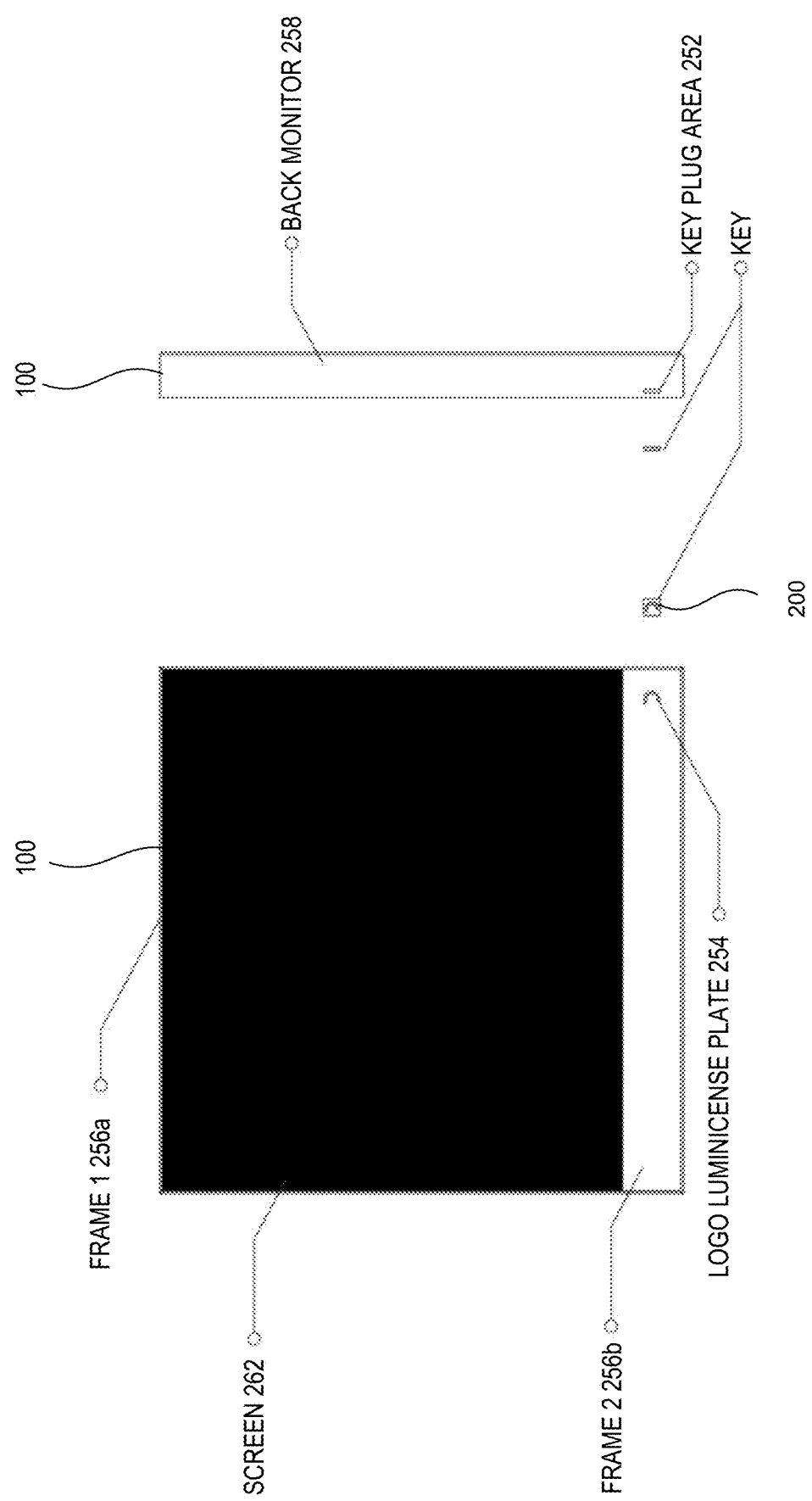
FIGS. 5A-5B are perspective views, in various orientations, of an example device for accessing and displaying digital artworks.
Figure 5B:
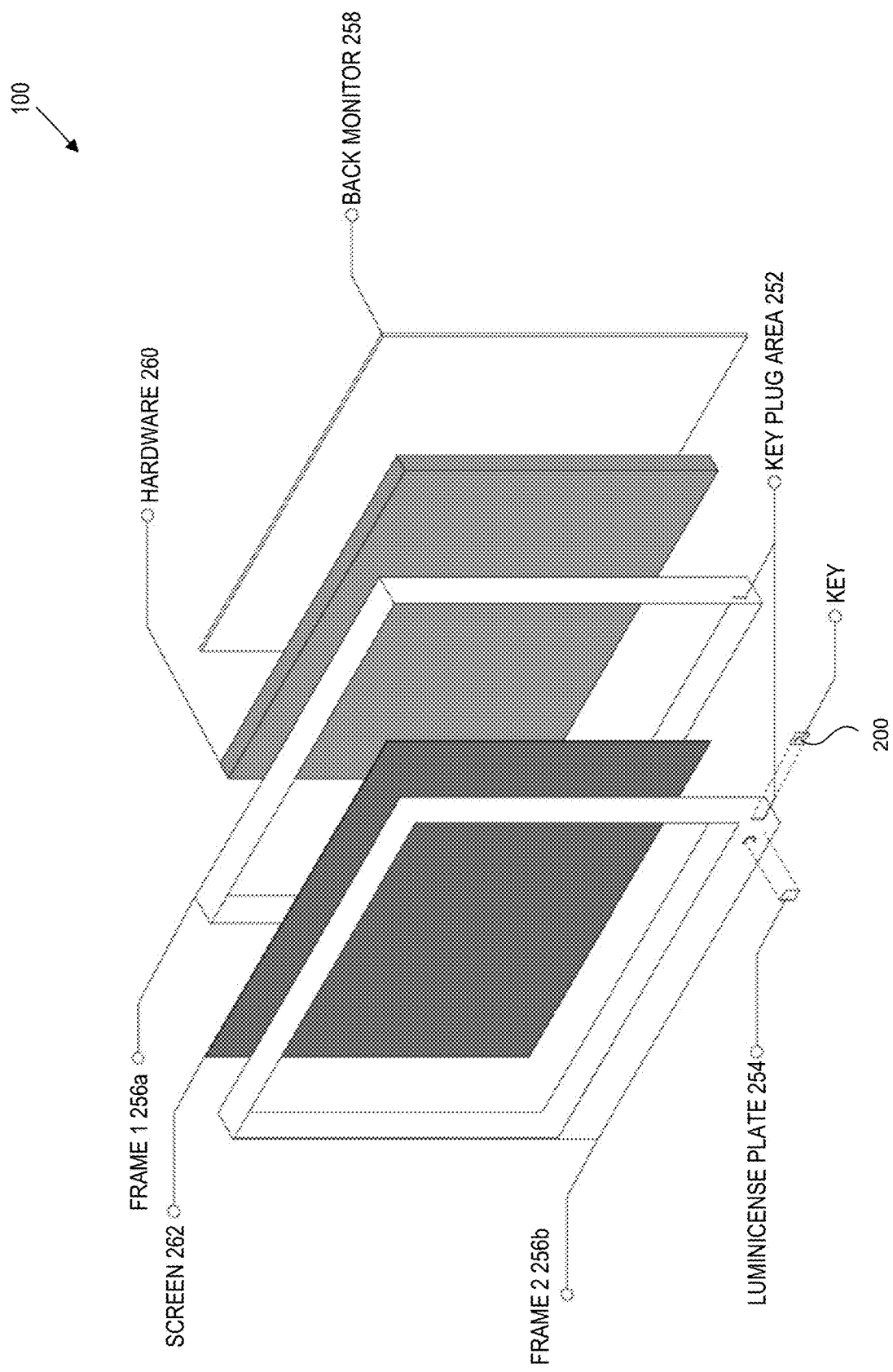

FIG. 5A is a perspective view illustrating front and side views of a display device 100, as disclosed herein, together with a removable security key 200 that can be inserted into the display device 100. FIG. 5B is a perspective view illustrating an exploded view of a display device 100. As shown, the display device 100 includes a plug area 252 where a removable security key 200 can be inserted and connected via a wired and/or wireless connection, and the display device 100 includes a screen having an aspect ratio of ~1:1.

As shown, the display device 100 includes a screen having an aspect ratio of approximately 1:1 and an indicator via which edition information can be displayed. The display device 100 includes a plug area 252 where a removable security key 200 can be inserted and connected via a hardware connection, such as a universal serial bus (USB) (e.g., USB-C) or Lightning connection. Other wired or wireless connections are also possible, such as Bluetooth and/or WiFi connections. In some embodiments, for example, a digital key can be used instead of or in addition to the removable security key 200. The digital key can be provided to the display device 100 via a wired or wireless connection (e.g., electronically transmitted from a user computing device, cast from a user computing device, and/or retrieved from a remote computing system by circuitry provided to the security key 200, such as the user account module 210 of FIG. 2A).

As shown, the display device 100 can include a combination of a first frame 256a and a second frame 256b, which provide a housing for the screen 262. In some embodiments, the second frame 256b can include a luminescence plate 254, which is structured to display a visual indicator. In some embodiments, the visual indicator can include a printed circuit board (PCB) comprising an array of light-emitting diodes (LEDs) and a light diffuser. The light diffuser can include a cut sheet of acrylic material, soft-tooled polycarbonate plastic material, or another suitable material. As shown, the display device 100 can include a back monitor 258, which is structured to support the hardware components of the display device 100, including, for example, hardware 260 that houses electronic components of the display device 100. The electronic components can include, for example, a host control system (e.g., a secure boot circuit, a state machine circuit, an authentication circuit, a media player, a touchscreen control circuit, etc.). In some embodiments, the electronic components can include a communication interface (e.g., Ethernet, WiFi, Bluetooth, NFC) coupled to the host control system via a wired bus protocol suitable for serial data transfer, such as I2C and/or SPI. Further, the electronic components can include an audio hardware module (e.g., a transducer array, an amplifier, a digital-to-analog converter (DAC), a digital signal processor (DSP)) coupled to the host control system via a wired bus protocol suitable for serial data transfer, such as I2C and/or SPI.

In some embodiments, the electronic components can include a sensor array, such as one or more ambient light sensors, motion sensors, proximity sensors and/or presence sensors. The sensor array can be coupled to the host control system via a wired protocol, such as I2C, SPI and/or USB. According to various embodiments, the circuitry on the host control system can cause the display device 100 to perform any of the following example operations: adjust its brightness in response to determining an ambient light level, display a particular digital artwork, exit screensaver/sleep mode in response to detecting user presence within a predetermined distance (e.g., 3 ft, 10 ft, 15 ft, etc.), zoom in on a component of a particular digital artwork in response to detecting a user interaction via a touchscreen, and so forth.

Figure 6A:
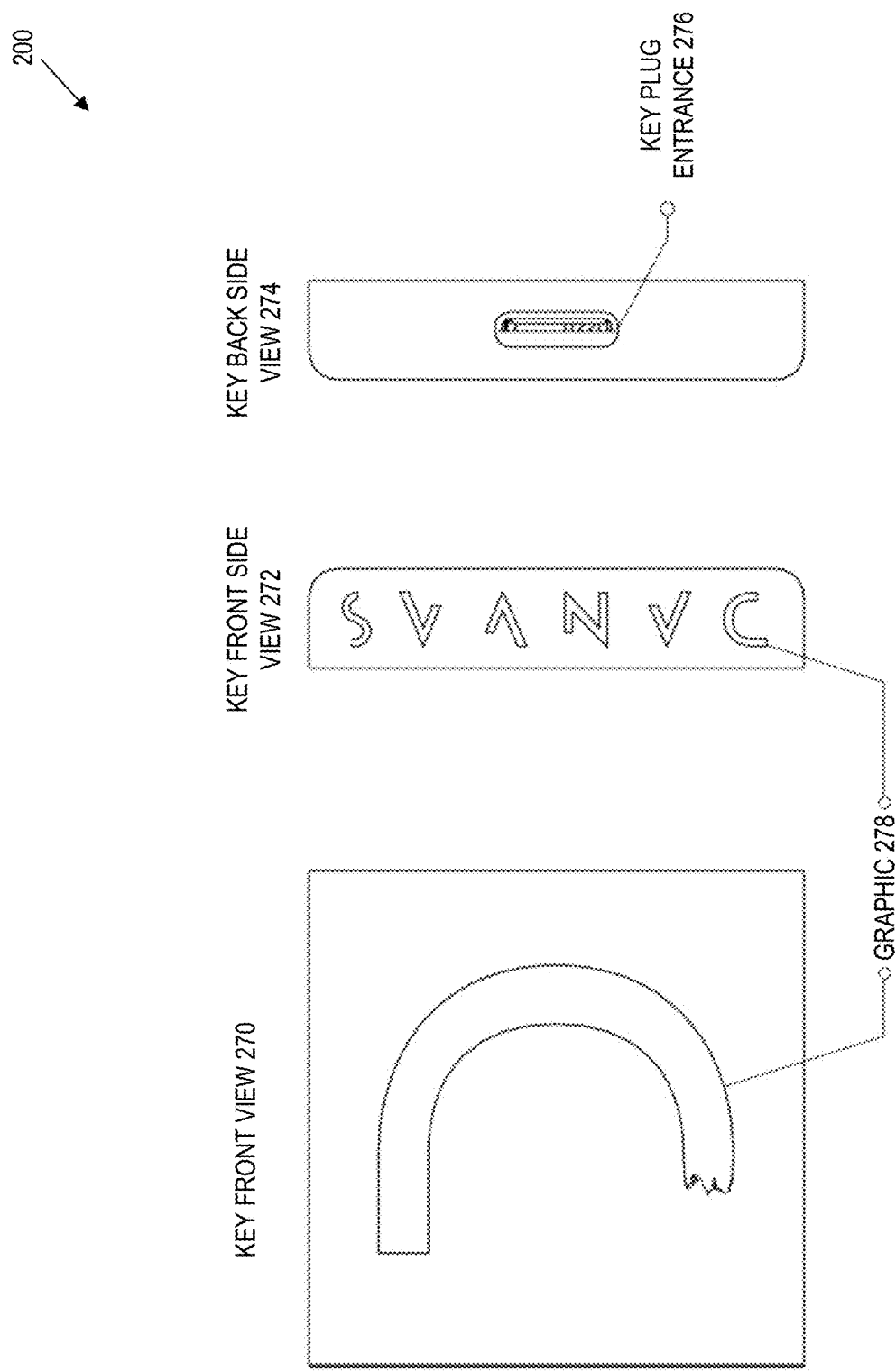
Figure 6B:
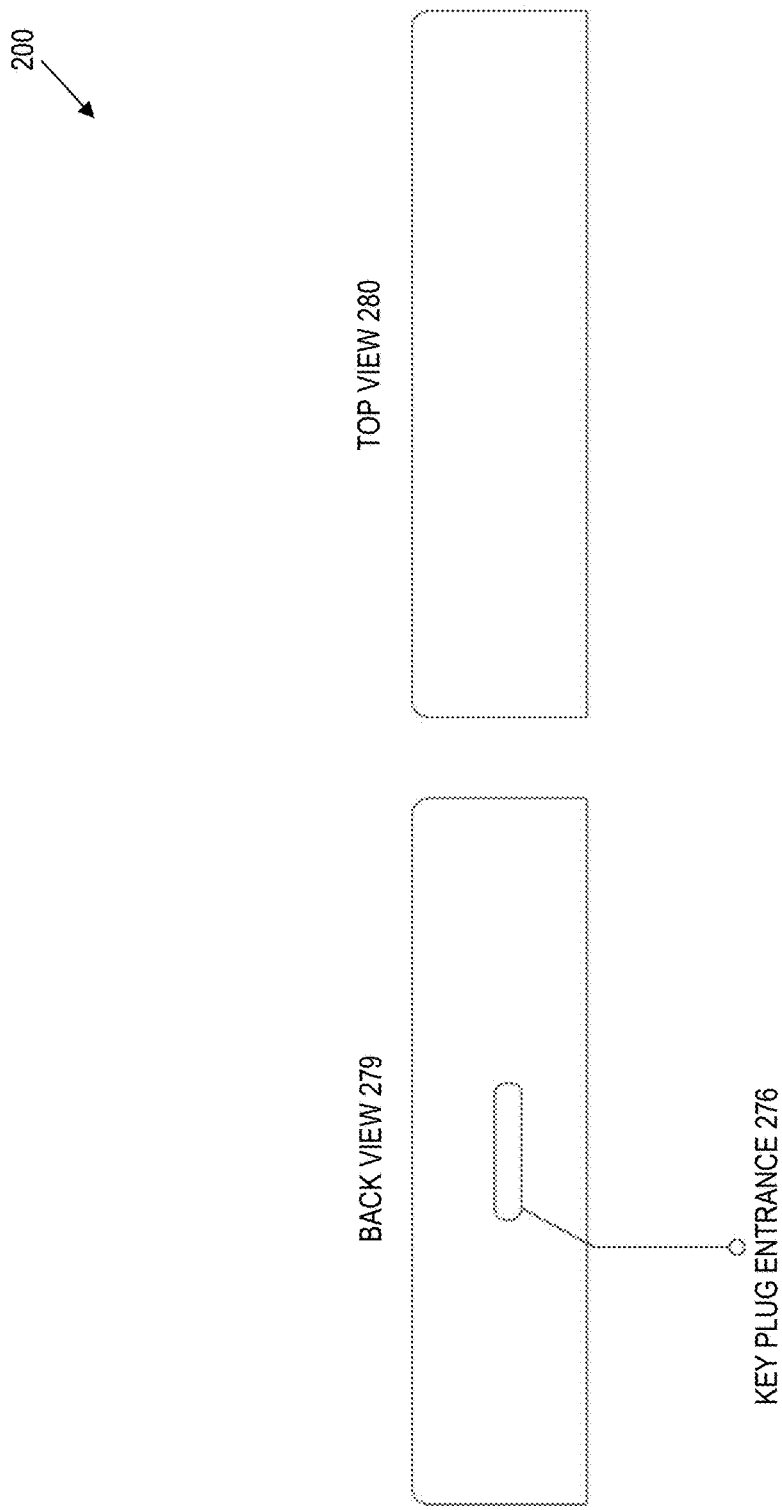
Figure 6D:
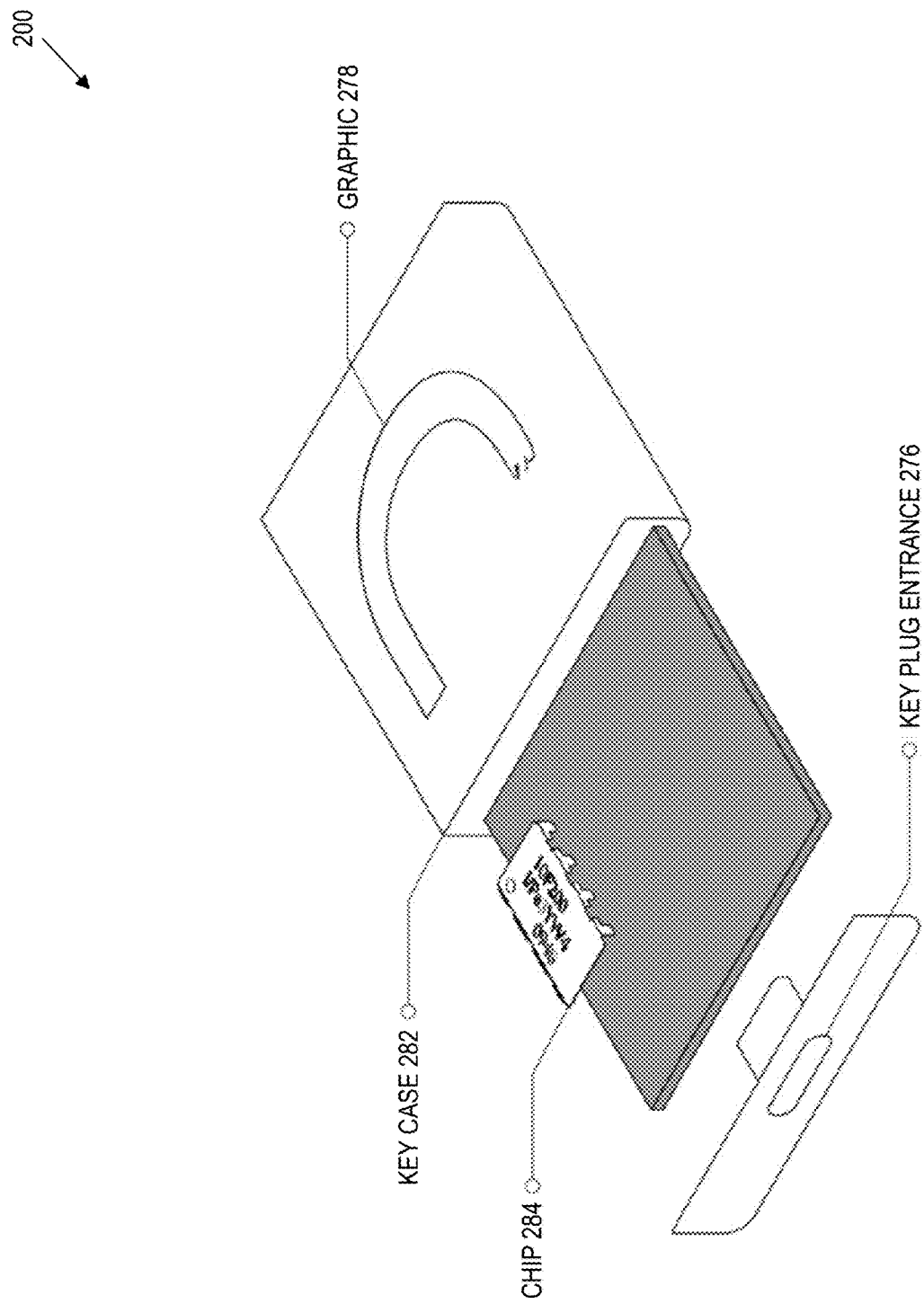
Figure 6E:
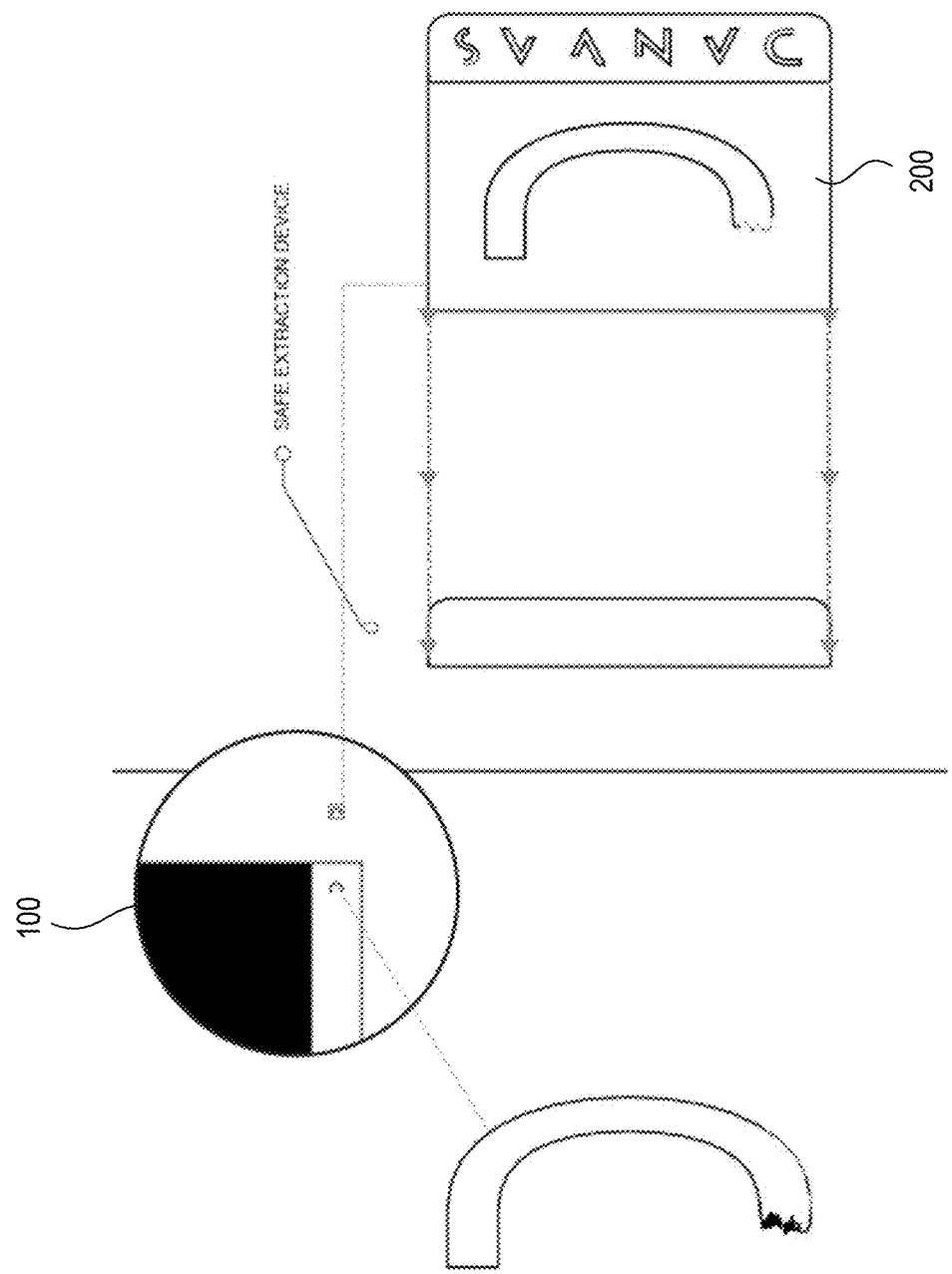

FIG. 6A is a perspective view illustrating front (270) and side (272, 274) views of a removable security key 200 as disclosed herein. FIG. 6B is a perspective view illustrating bottom (279) and top (280) views of a removable security key 200 as disclosed herein. FIG. 6C is a perspective view illustrating a removable security key 200 as disclosed herein. FIG. 6D is a perspective exploded view illustrating a removable security key 200 as disclosed herein. FIG. 6E is a perspective view illustrating a connection between a removable security key 200 and a display device 100.

In an example embodiment, the removable security key 200 includes a mini plug 276, which can facilitate a communicative coupling between the display device 100 and removable security key 200. The mini plug 276 can be positioned in a suitable location on the outer surface of the removable security key 200 and can facilitate a such as a Lightning connection, USB connection, or any other suitable connectivity type between the display device 100 and removable security key 200. When communicatively coupled, the display device 100 and removable security key 200 can exchange data, commands, computer-executable instructions, and the like. For example, the removable security key 200 can include one or more chips 284 disposed within the key case 282. The one or more chips 284 can store data and/or computer-executable instructions, such as those described with respect to FIG. 2A. The one or more chips 284 can be removably (e.g., via a card reader, a USB port, a micro-USB port) or non-removably integrated with the key case 282 and can be implemented in any suitable form, including, for example, an integrated circuit, dynamic random-access memory (DRAM) stick, a memory card, a secure digital (SD) card, a flash drive, and/or the like. In operation, the one or more chips 284 can exchange data, commands and/or computer-executable instructions with the display device 100 to perform operations described herein. These operations can include, for example, device authentication, user authentication, provisioning (access, display, etc.) of digital artworks, transactions associated with digital artworks, and/or the like.

FIGS. 7A-7K are example graphical user interface (GUI) diagrams for a mobile device application configured to allow a user to manage digital artwork, display connectivity, and other settings. A mobile device can download an app to provide tools and controls that allows a user, via the GUI, to control or adjust various functions described herein with respect to one or more display devices.

Figure 7A:
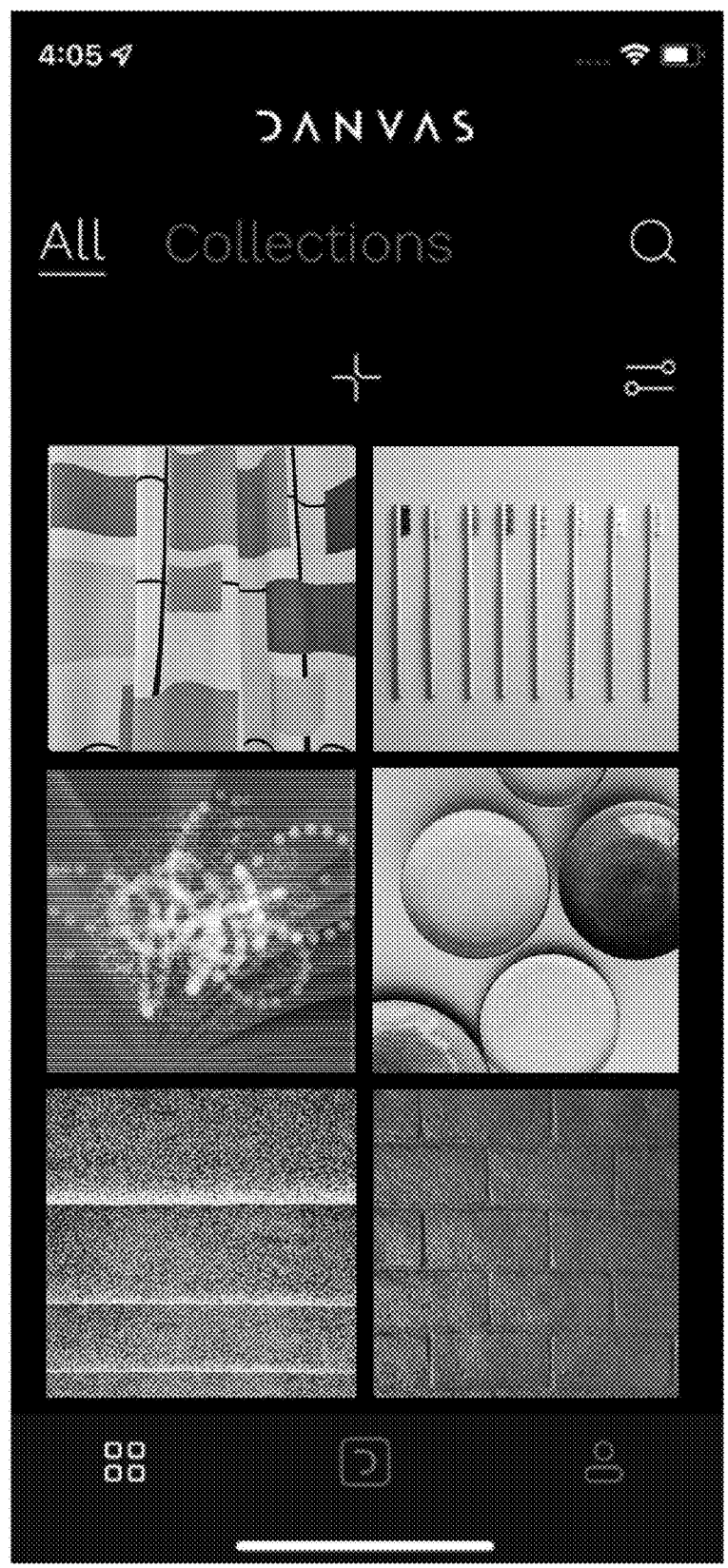
FIGS. 7A-7K are example graphical user interface (GUI) diagrams for a mobile device application configured to allow a user to manage digital artwork, display connectivity, and other settings.
Figure 7B:
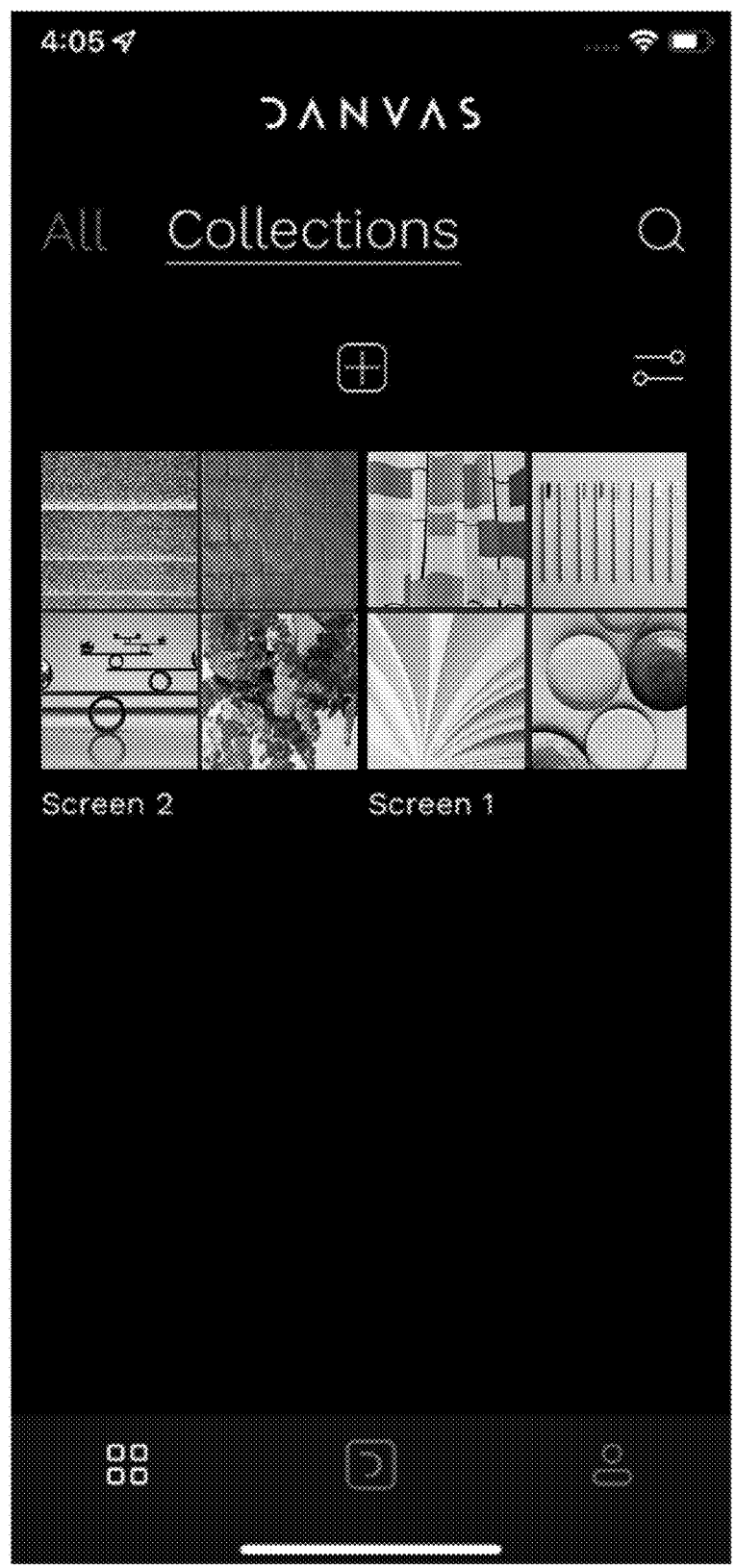
Figure 7C:
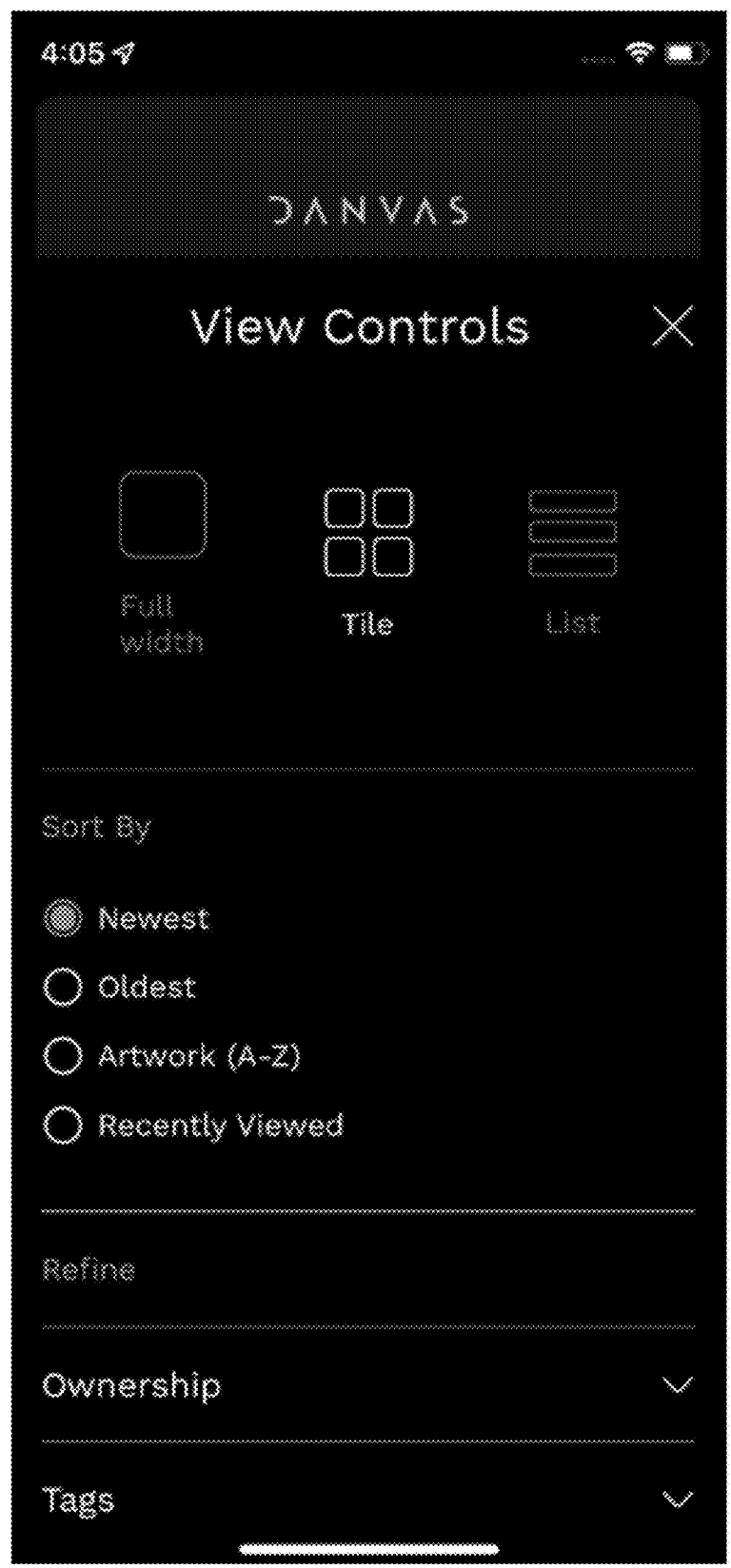
Figure 7D:
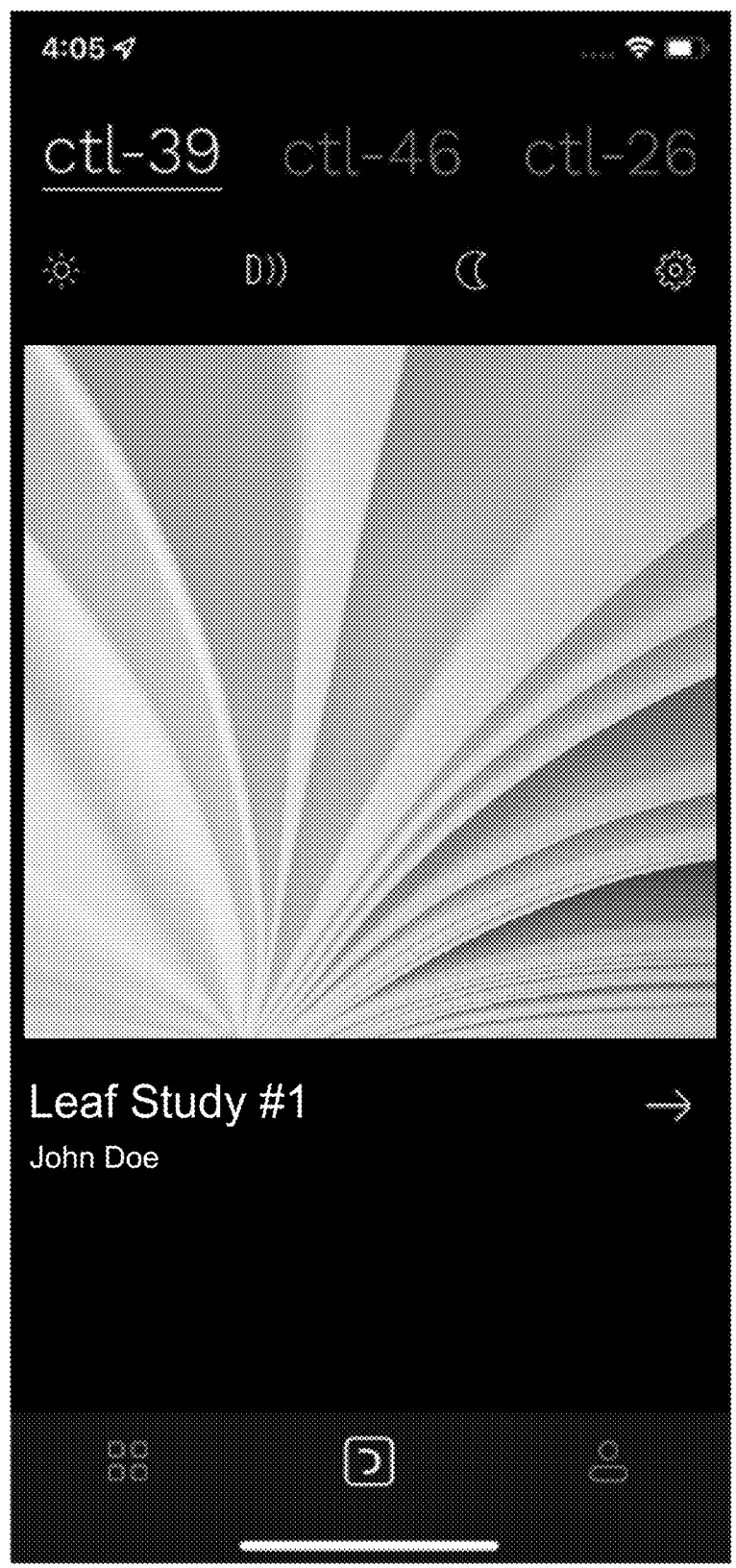

FIGS. 7A-7D show example NFT management settings. FIG. 7A is an example view of digital artwork items associated with NFTs, where the digital artwork can be displayed in tiles, thumbnails or other suitable user interface components, such as the view controls shown in FIG. 7C. When displayed, digital artwork items can be scaled to fit the size and aspect ratio of the user-specified corresponding container controls. As shown, the digital artwork items can be organized into collections or other suitable groupings. For instance, as shown in FIG. 7B, the collections can correspond to particular display devices, and items in a particular collection can be cast to a particular display device together with other items from the collection. Furthermore, items in collections can be sorted according to various parameters, such as newest, oldest, alphabetical by name, or recently viewed. In some embodiments, the sort setting can apply to the order in which the artwork items are displayed on the mobile device. In some embodiments, the sort setting can apply to the order in which the artwork items are displayed on the display device. As shown, the digital items can be filtered by ownership status, user-defined tags, and other characteristics. The application can parse the corresponding metadata items from NFTs in order to determine whether the metadata values match the user-selected filtering criteria. Further, as shown in FIG. 7D, after a user navigates to a particular digital item, the user may select a digital display to cast the item to (as shown, example displays "ctl-39", "ctl-46", and "ctl-26").

Figure 7E:
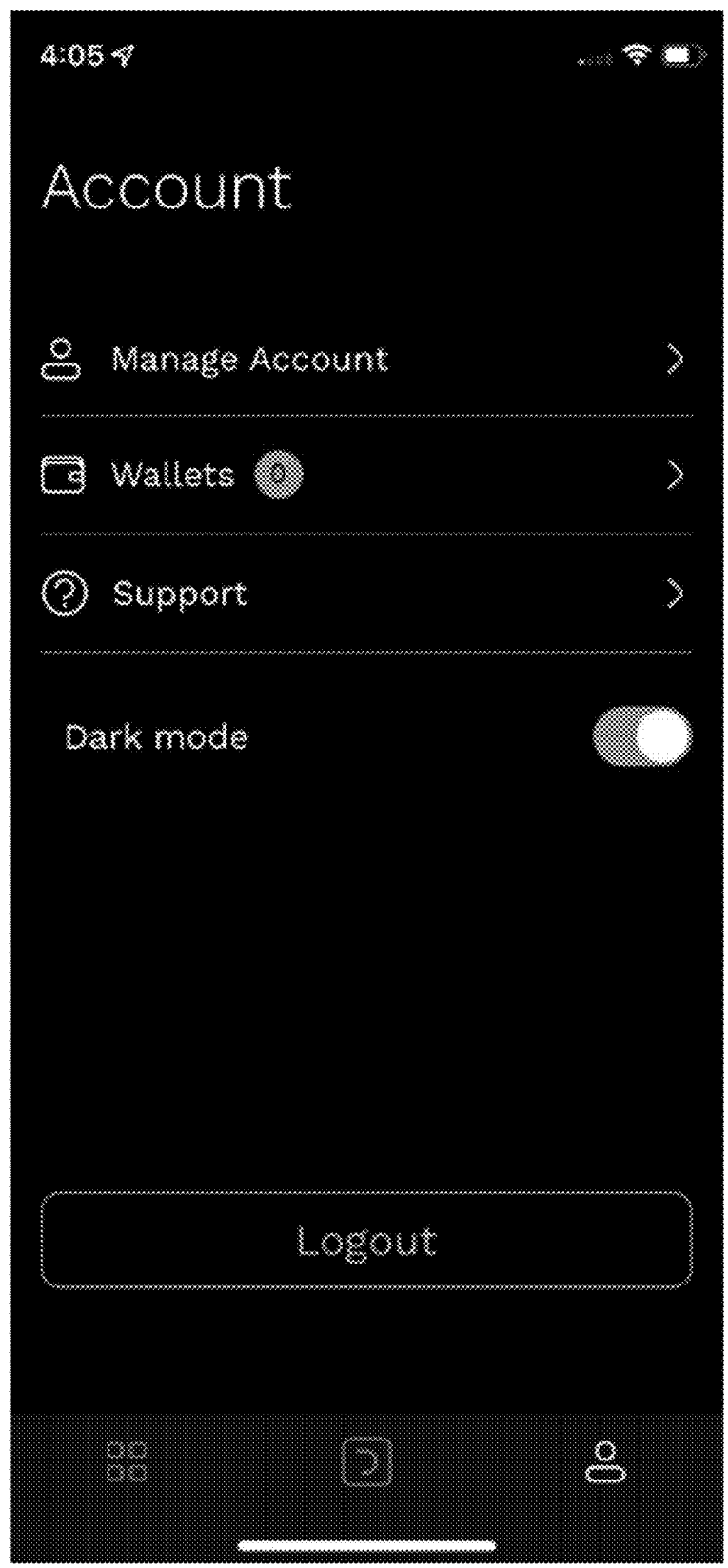
Figure 7F:
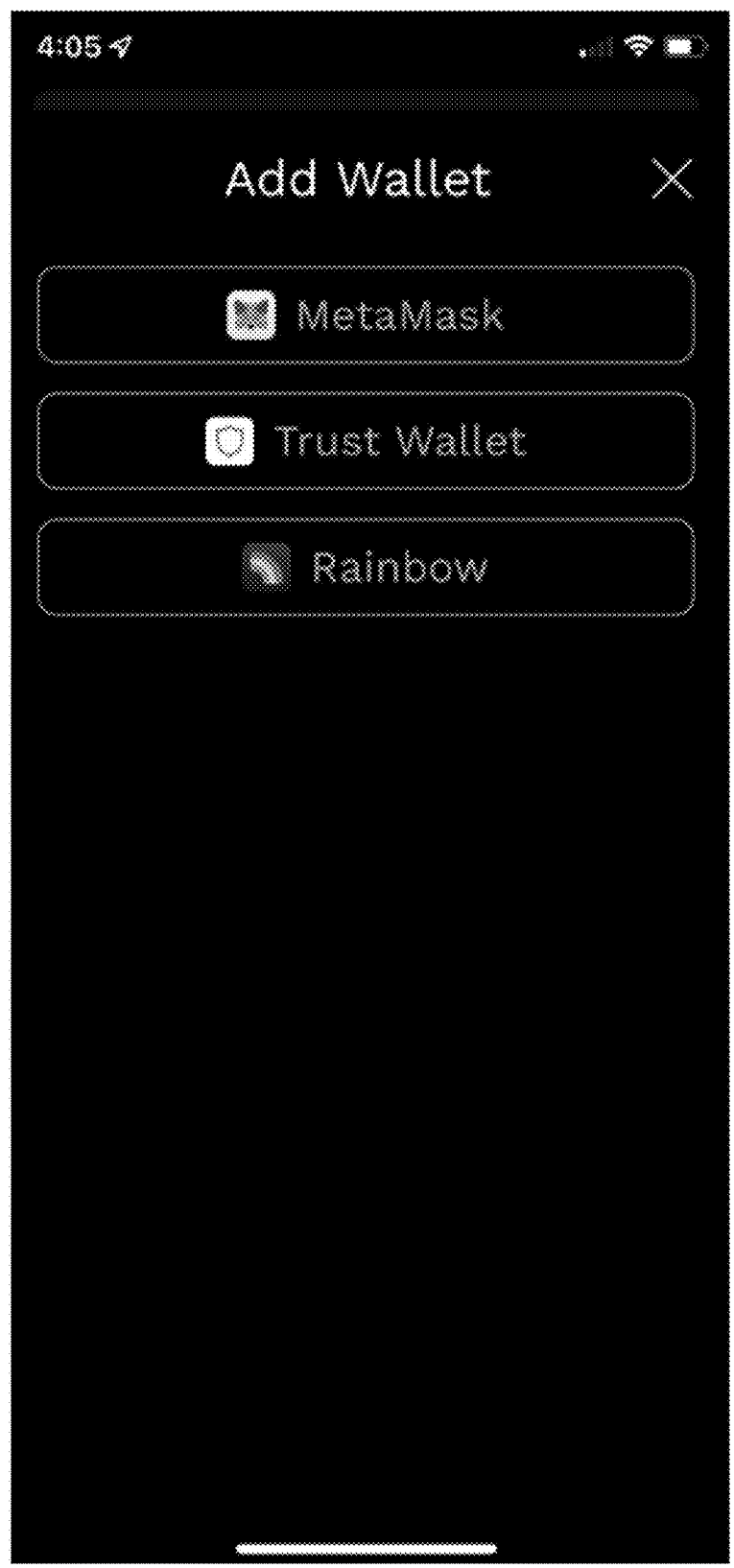

FIGS. 7E and 7F show example account management settings. A user can log into the application on a user mobile device (e.g., a phone, a tablet, a laptop, or another suitable device with a wireless connectivity interface). The user can log in by providing a username and password or through another suitable method. For example, a particular instance of the installed application can be associated with a user's email address, social networking handle, account name, telephone number, device identifier, or another identifier, and, when opening the application, the user may be prompted to enter a PIN code, provide a token, provide biometric information for authentication, and the like. After logging in, the user can navigate to various account and wallet settings, as shown in FIG. 7E. As shown in FIG. 7F, after navigating to wallet settings, the user can link the application to a digital or cryptographic wallet, such as, for example, a third-party wallet. Once a wallet is linked, the NFT items stored in the wallet can be accessible via the application. In some embodiments, a user can select specific NFT items from a wallet to be cast to a display device and/or delete the NFT items once they are selected. When deleted, the NFT items can continue to be accessible through the wallet and become unavailable to be cast to display devices. Deleting NFT items via the mobile application can also clear the cache and cause the system to destroy any cached metadata, temporarily stored copies, etc.

Figure 7G:
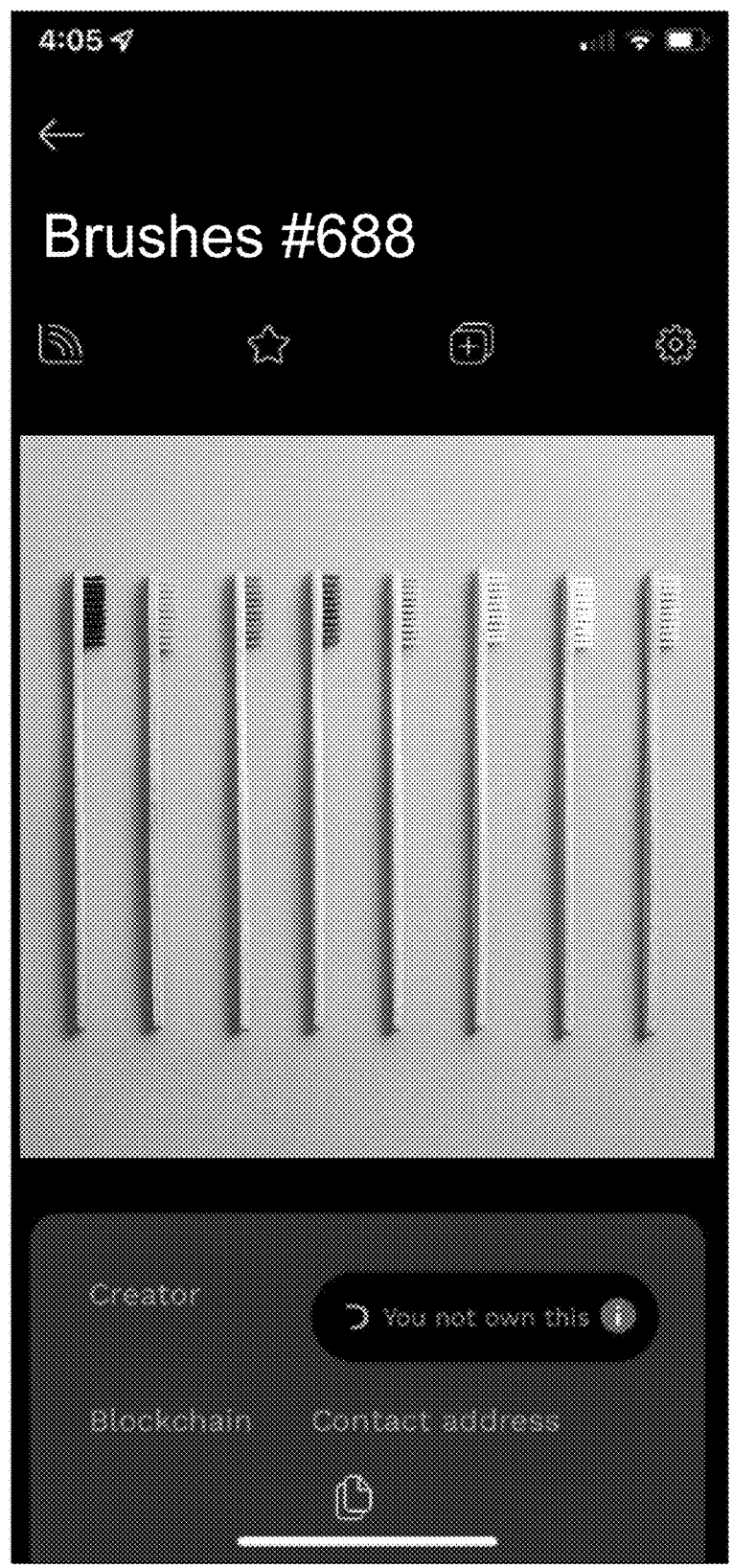
Figure 7H:
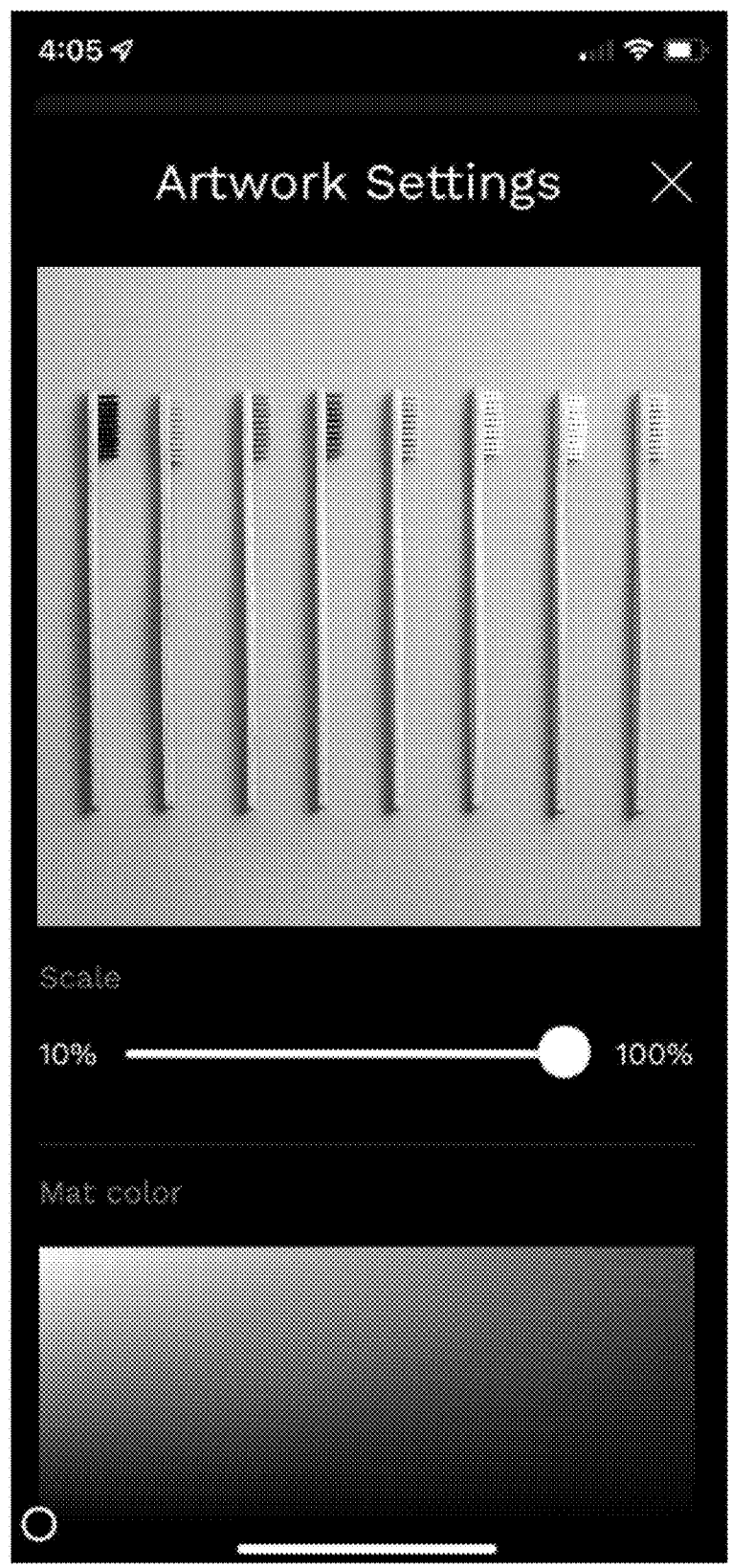
Figure 7I:
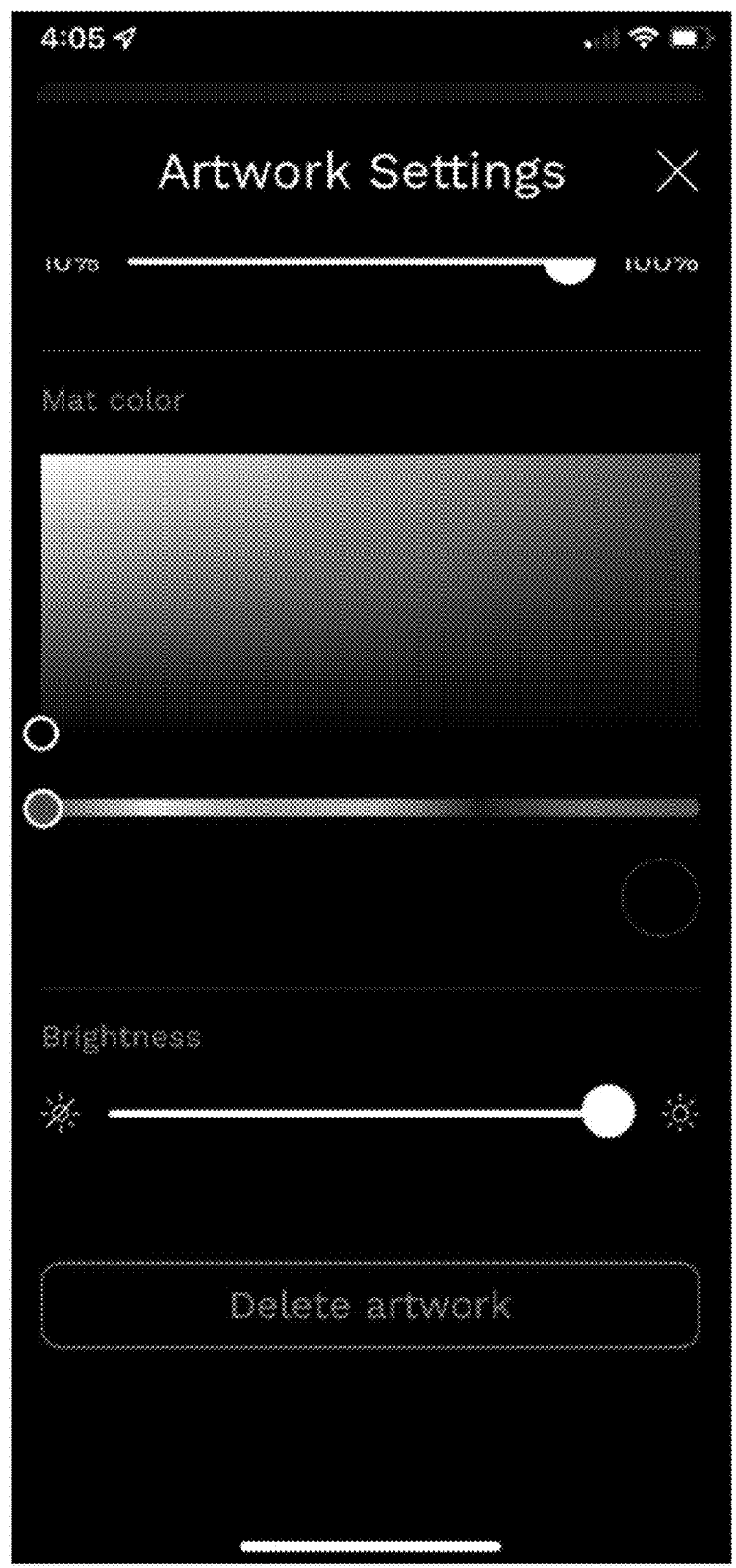

FIGS. 7G-7I show example artwork management settings for digital items cast to a display device. For instance, as shown in FIG. 7G, a user can navigate to a particular digital artwork and access various properties within metadata of the associated NFT. The properties can include, for example, NFT creator information, NFT blockchain information, NFT token type (e.g., ERC-721, ERC-1155), NFT ownership status, etc. In some embodiments, the NFT can be a fractional NFT (F-NFT), and the ownership status can reflect the logged-in user's percentage or share of ownership in the corresponding digital item. As shown in FIG. 7H, the GUI can include presentation-related settings. For instance, the user can select a display mat to be displayed around an artwork or digital item, specify the scale of the displayed digital item relative to the mat, specify a mat color, etc. As shown in FIG. 7I, users can further adjust a brightness level for the displayed artwork.

Figure 7J:
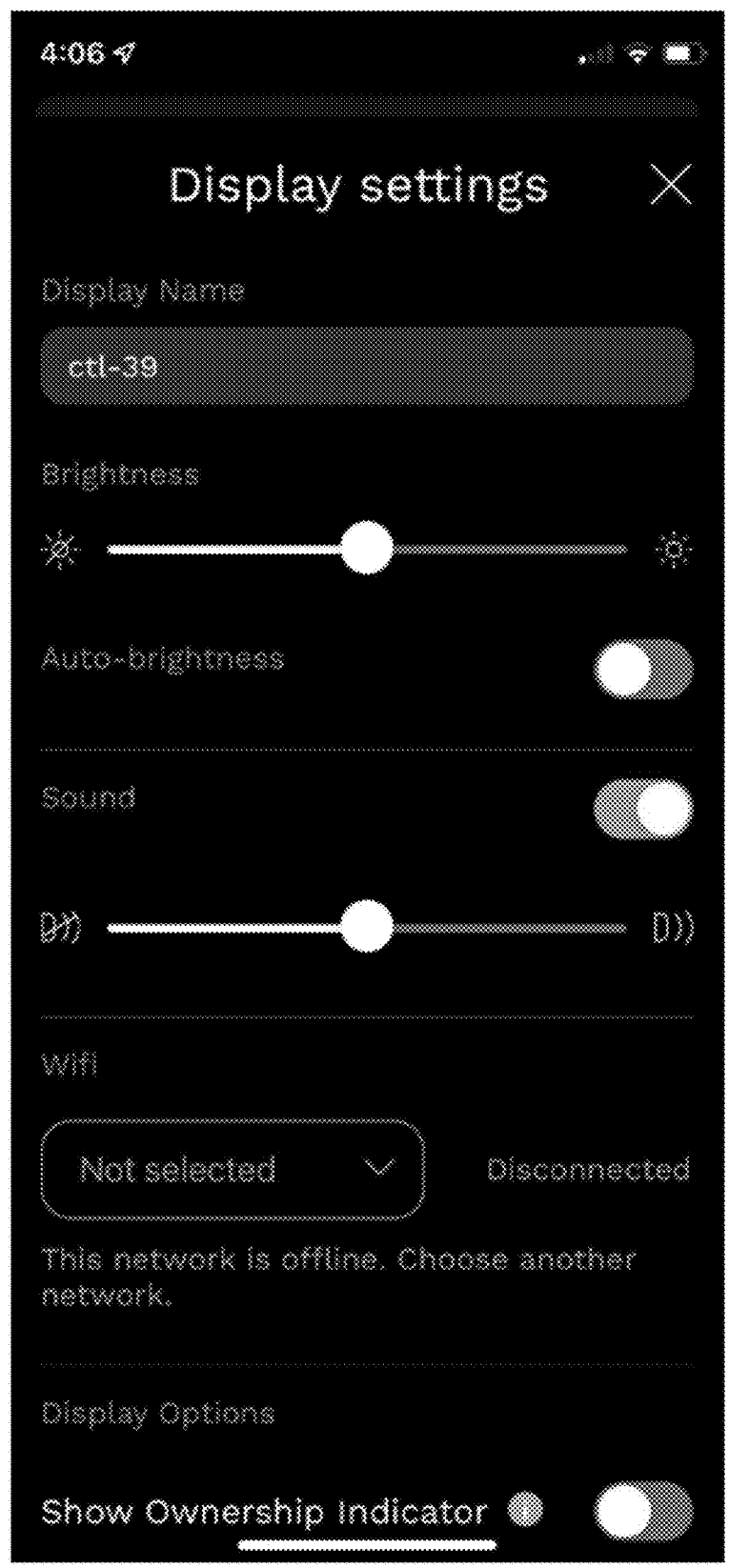
Figure 7K:
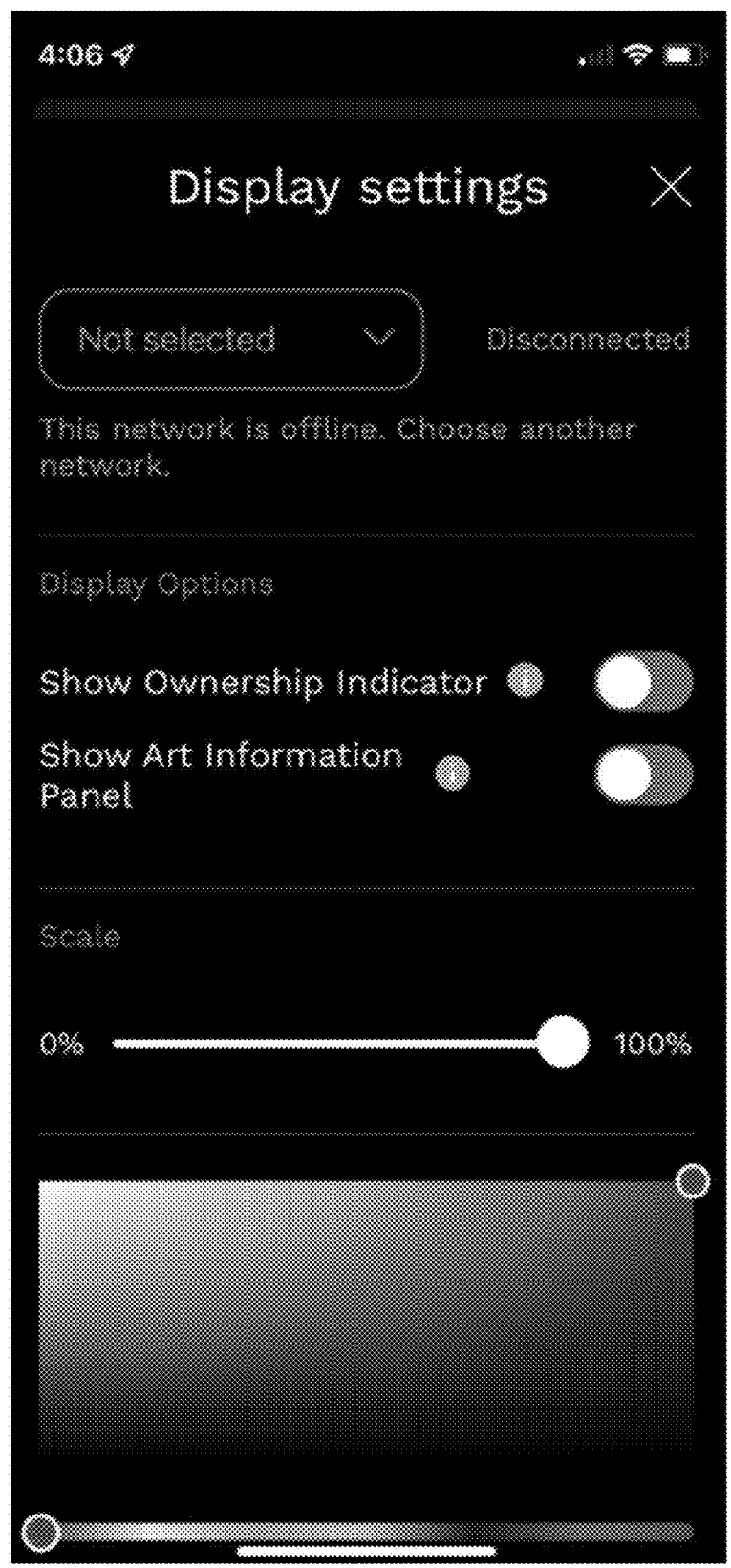

FIGS. 7J and 7K show example display management settings. An application instance can include computer-executable code to discover display devices in the vicinity of the mobile device. After the application is communicatively coupled to a particular display device and an authorized communication session is established, the user can use the GUI of FIGS. 7J and 7K to set certain display device properties, such as brightness level, auto-brightness, volume level, WiFi network to use, etc. In some embodiments, the GUI can be used to specify indicator-related properties, such as whether the indicator should be activated on the display device, whether an artwork information panel should be activated on the display device, etc. If displayed, the indicator and/or the artwork information panel can be configured based on NFC metadata associated with the displayed item. In some embodiments, the metadata and/or the displayed item can be cached on the display device or the mobile device for a predetermined period of time. In some embodiments, the GUI can be used to specify the scale of the displayed item, the aspect ratio of the displayed item, etc.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system for displaying digital content, the system comprising:
   at least one processor;
   a visual output device coupled to the at least one processor;
   a network interface component;
   memory coupled to the at least one processor;
   a visual indicator component coupled to the at least one processor; and
   a housing at least partially enclosing the at least one processor, visual output device, network interface component, memory and indicator component, wherein the memory stores instructions, which when executed by the at least one processor, perform operations to:
      establish, via the network interface component, a secure communications session between the at least one processor and a portable data storage security key, wherein the secure communications session is associated with a user account;
      receive, by the at least one processor, via the network interface component and from the portable data storage security key during the secure communications session, a digital visual artwork associated with a unique cryptographic token, wherein the unique cryptographic token is a non-fungible token (NFT);
      determine, by the at least one processor and based on metadata parsed from the unique cryptographic token, chain-of-ownership information regarding the unique cryptographic token;
      determine, by the at least one processor, whether user account information corresponds to an item included in the chain-of-ownership information; and
      in response a determination that the user account information corresponds to the item included in the chain-of-ownership information, display the digital visual artwork via the visual output device;
      based on the determination, set a color of a color-coded visual indication, wherein the color indicates at least one of authenticity, ownership status, rental status, limited edition information, or open edition information of the visual artwork; and
      cause the visual indicator component to output the color-coded visual indication to a user.

2. The system of claim 1, wherein the operations further comprise:
   cause the visual indicator component to provide an indication of at least one of: collection information associated with the displayed digital visual artwork, ownership status information associated with the digital visual artwork, or viewership information associated with the digital visual artwork, and,
   wherein the at least one of collection information associated with the displayed digital visual artwork, ownership status information associated with the digital visual artwork, or viewership information associated with the digital visual artwork is determined, by the at least one processor, based at least in part on the metadata.

3. The system of claim 1, wherein the portable data storage security key is removably coupled to the network interface component via a receiving port included in the housing, wherein the portable data storage security key is in wired communication with the system, wherein the digital visual artwork is a multimedia artwork, and wherein the system includes at least one speaker, coupled to the at least one processor, to output audio content associated with the multimedia artwork.

4. The system of claim 1, wherein the portable data storage security key is in wireless communication with the system via the network interface component, wherein the secure communications session is established according to a parameter, wherein the parameter relates to a time limit regarding the secure communications session, and wherein the portable data storage security key is in wireless communication with another system that displays another digital visual artwork.

5. The system of claim 4, wherein the parameter comprises a predetermined distance threshold between the visual output device and the portable data storage security key, and the housing further comprises a proximity sensor communicatively coupled to the at least one processor, and wherein the operations further comprise:
   in response to determining, by the at least one processor, that a distance, determined by the proximity sensor, between the visual output device and a mobile device exceeds the predetermined distance threshold,
      forgo displaying the digital visual artwork via the visual output device; and
      terminate the secure communications session.

6. The system of claim 1, wherein the housing further comprises at least one of a motion sensor or a touchscreen communicatively coupled to the at least one processor, and wherein the operations further comprise:
   responsive to detecting, via the at least one of the motion sensor or the touchscreen, a user interaction with the system, reconfigure the displayed digital visual artwork while maintaining at least one of a shape, an aspect ratio, or a resolution of the displayed digital visual artwork.

7. The system of claim 6, wherein reconfiguring the displayed digital visual artwork comprises changing at least one dimension of the displayed digital visual artwork or changing a layout of the digital visual artwork relative to the visual output device, or both, and wherein the visual output device is a 1:1 aspect ratio LCD display having a 4 k, 8 k or higher resolution.

8. A computer-implemented method of displaying digital content, the method comprising:
   with a display device comprising a housing that includes a processor of one or more processors, a visual output device, and an indicator component:
      establishing a secure communications session between the display device and a mobile device,
         wherein the secure communications session is associated with a user account, and
         wherein the secure communications session relates to an authorized pairing between the display device and the mobile device;
      receiving, by the display device from the mobile device during the secure communications session, an image-based item associated with a unique cryptographic token;
      determining, by the processor of the display device based on metadata parsed from the unique cryptographic token by the display device, chain-of-ownership information regarding the unique cryptographic token;
      comparing, by the processor of the display device, user account information to an item included in the chain-of-ownership information; and
      based on comparing user account information to the item included in the chain-of-ownership information, performing operations comprising:
         determining that the user account information corresponds to the item included in the chain-of-ownership information;
         displaying the image-based item via the visual output device;
         setting a color of a color-coded visual indication, wherein the color indicates at least one of authenticity, ownership status, rental status, limited edition information, or open edition information of the image-based item; and
         causing the indicator component to provide the color-coded visual indication for the image-based item.

9. The method of claim 8, further comprising:
   causing the indicator component to provide an indication of at least one of collection information associated with the displayed image-based item, ownership status information associated with the image-based item, or viewership information associated with the image-based item,
      wherein the at least one of collection information associated with the displayed image-based item, ownership status information associated with the image-based item, or viewership information associated with the image-based item is determined, by the processor, based at least in part on the metadata; and,
   wherein the unique cryptographic token is a non-fungible token (NFT).

10. The method of claim 8, wherein the mobile device is removably coupled to the display device via a receiving port included in the housing; and wherein the mobile device is in wired communication with the display device.

11. The method of claim 8, wherein the mobile device is in wireless communication with the display device, and wherein the secure communications session is established according to a parameter, wherein the parameter relates to a time limit regarding the secure communications session or a predetermined distance threshold between the display device and the mobile device.

12. One or more computer-readable media excluding transitory signals and having computer-executable instructions stored thereon, the instructions configured to cause at least one processor of a computing system to perform operations comprising:
   with a display device comprising a housing that includes a visual output device and an indicator component and a mobile device:
      establishing a secure communications session between the display device and the mobile device,
         wherein the secure communications session is associated with a user account, and
         wherein the secure communications session relates to an authorized pairing between the display device and the mobile device;
      causing the mobile device to transmit to the display device, during the secure communications session, an image-based item associated with a unique cryptographic token;
      determining, based on metadata parsed from the unique cryptographic token, chain-of-ownership information regarding the unique cryptographic token;
      comparing user account information to an item included in the chain-of-ownership information; and
      based on comparing user account information to the item included in the chain-of-ownership information, performing operations comprising:

determining that the user account information corresponds to the item included in the chain-of-ownership information;
causing the display device to display the image-based item via the visual output device;
setting a color of a color-coded visual indication, wherein the color indicates at least one of authenticity, ownership status, rental status, limited edition information, or open edition information of the image-based item; and
causing the indicator component of the display device to provide the color-coded visual indication.

13. The media of claim 12, wherein the operations further comprise:
causing the display device to provide an indication of at least one of: collection information associated with the displayed image-based item, ownership status information associated with the displayed image-based item, or viewership information associated with the displayed image-based item,
wherein the at least one of collection information associated with the displayed image-based item, ownership status information associated with the displayed image-based item, or viewership information associated with the displayed image-based item is determined, by the at least one processor, based at least in part on the metadata.

14. The media of claim 12, wherein the image-based item relates to a multimedia artwork, and wherein the computing system includes at least one speaker, the operations further comprising:
causing the display device to output audio content associated with the multimedia artwork.

15. The media of claim 12, the operations further comprising:
establishing the secure communications session according to a parameter, wherein the parameter relates to a time limit regarding the secure communications session.

16. The media of claim 12, the operations further comprising:
establishing the secure communications session according to a parameter, wherein the parameter comprises a distance between the display device and the mobile device.

17. The media of claim 12, the operations further comprising:
reconfiguring the displayed image-based item maintaining at least one of a shape, an aspect ratio, or a resolution of the displayed image-based item; and
causing the display device to output a reconfigured item.

18. The media of claim 17, wherein reconfiguring the displayed image-based item comprises changing at least one dimension of the displayed image-based item, changing a layout of the displayed image-based item, or both.

* * * * *